United States Patent [19]

Nepple

[11] Patent Number: 4,609,827
[45] Date of Patent: Sep. 2, 1986

[54] SYNCHRO-VANE VERTICAL AXIS WIND POWERED GENERATOR

[76] Inventor: Richard E. Nepple, 1630 N. Lakeview Ln., Flagstaff, Ariz. 86001

[21] Appl. No.: 659,167

[22] Filed: Oct. 9, 1984

[51] Int. Cl.$^4$ .............................................. F03D 7/06
[52] U.S. Cl. ...................................... 290/44; 290/55; 416/119
[58] Field of Search ...................... 290/44, 55; 416/17, 416/111, 119

[56] References Cited

U.S. PATENT DOCUMENTS

| | | | |
|---|---|---|---|
| 4,052,134 | 10/1977 | Rumsey | 416/119 |
| 4,299,537 | 11/1981 | Evans | 416/119 |
| 4,303,835 | 12/1981 | Bair | 290/55 |
| 4,380,417 | 4/1983 | Fork | 416/111 X |
| 4,410,806 | 10/1983 | Brulle | 290/44 |
| 4,494,007 | 1/1985 | Gaston | 290/44 |

Primary Examiner—William M. Shoop, Jr.
Assistant Examiner—W. E. Duncanson, Jr.

[57] ABSTRACT

A vertical axis wind powered generator apparatus has airfoil shaped vanes, a positive and synchronous vane orientation system which is controlled by a mechanism located exterior to its rotor, two innovations for improving its aerodynamic efficiency and for increasing the rotary force and horsepower developed by a tall wind generator apparatus used to power a driven machine, and a system for operational control of the device.

20 Claims, 20 Drawing Figures

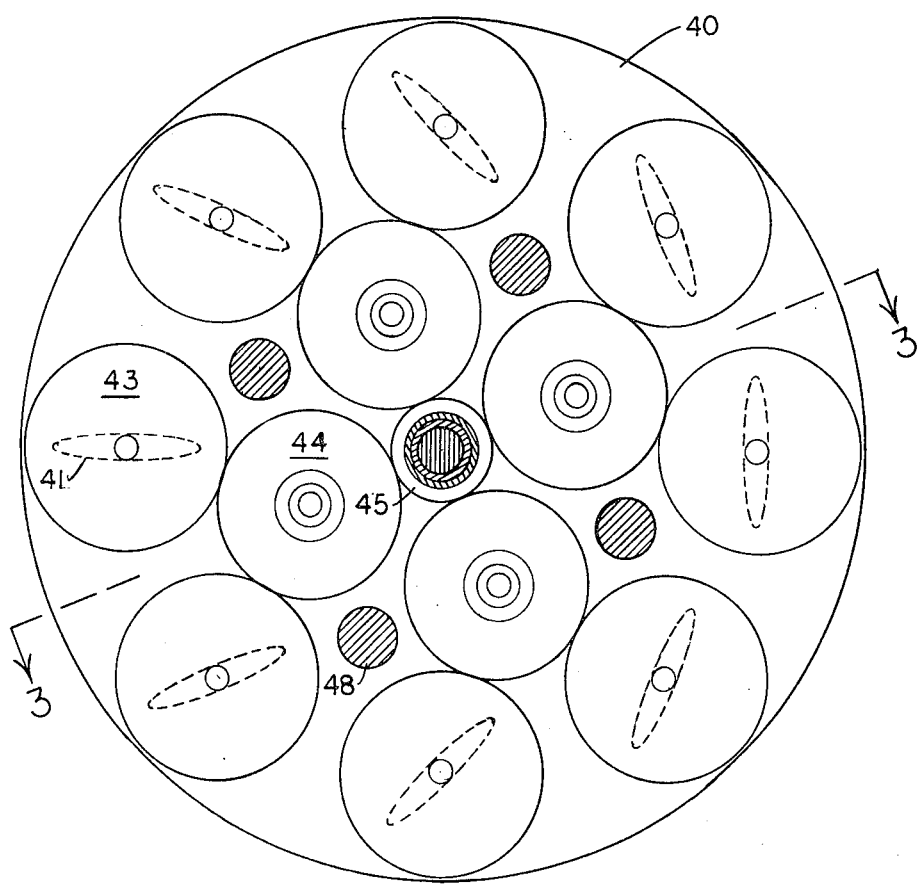

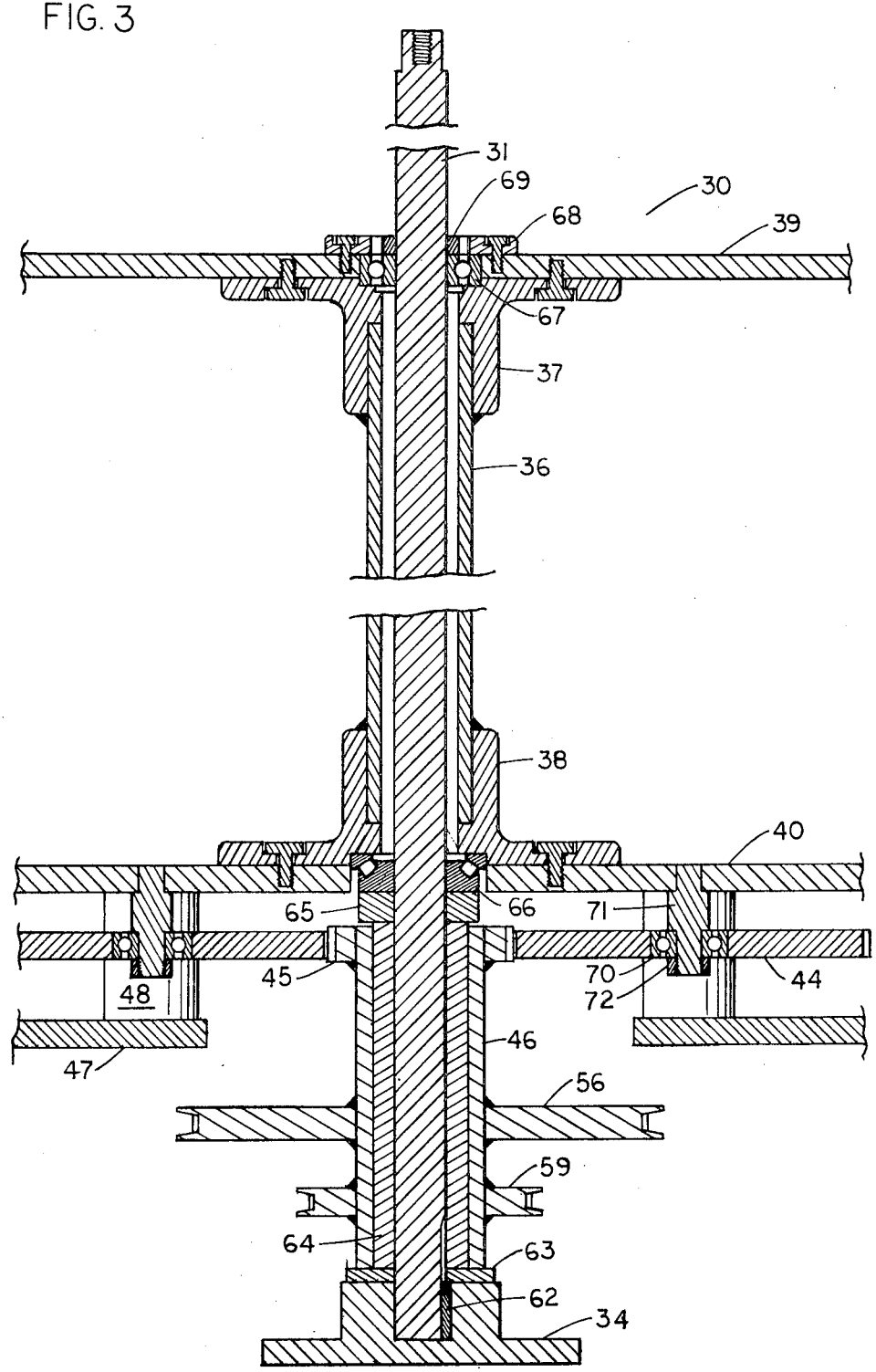

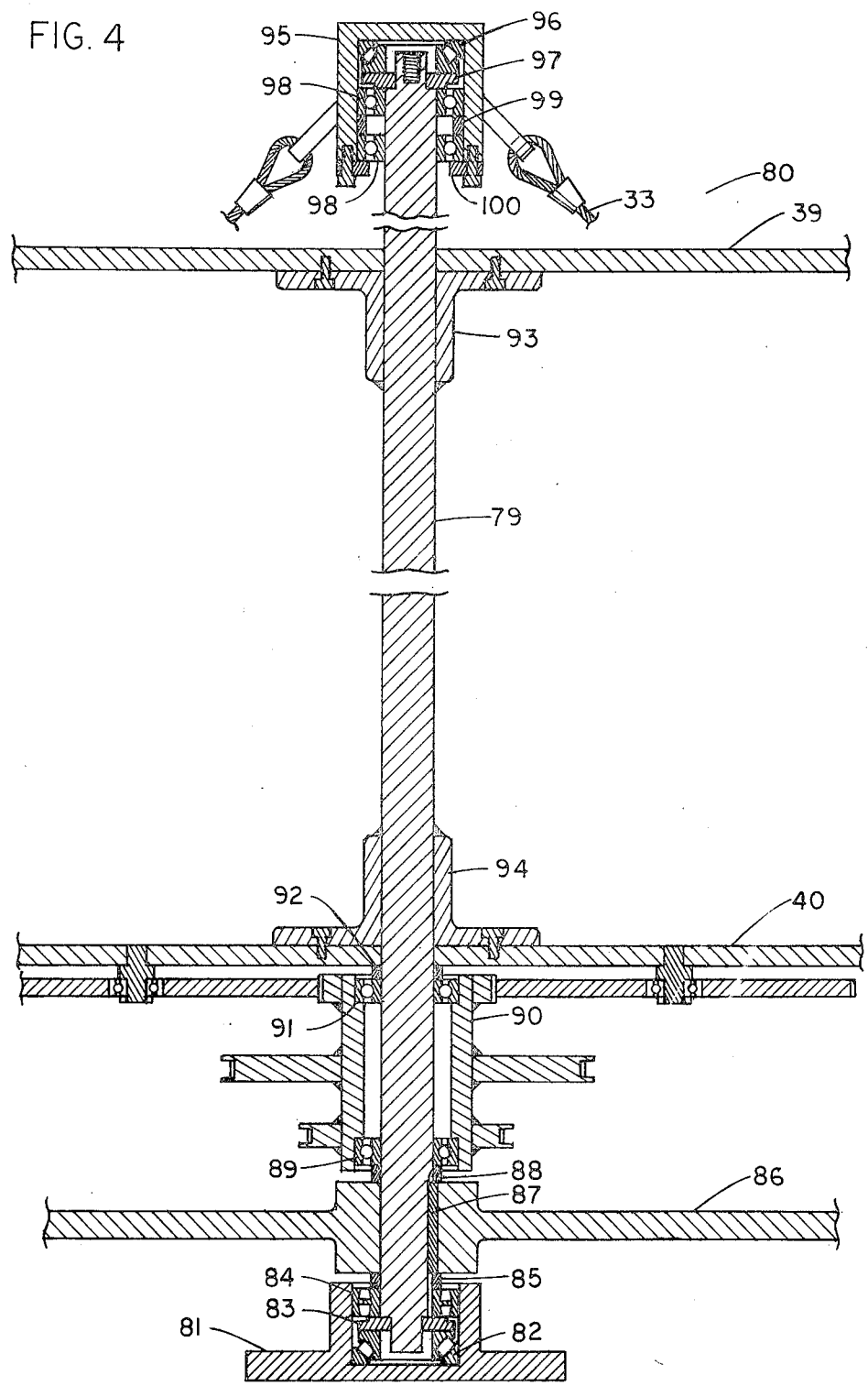

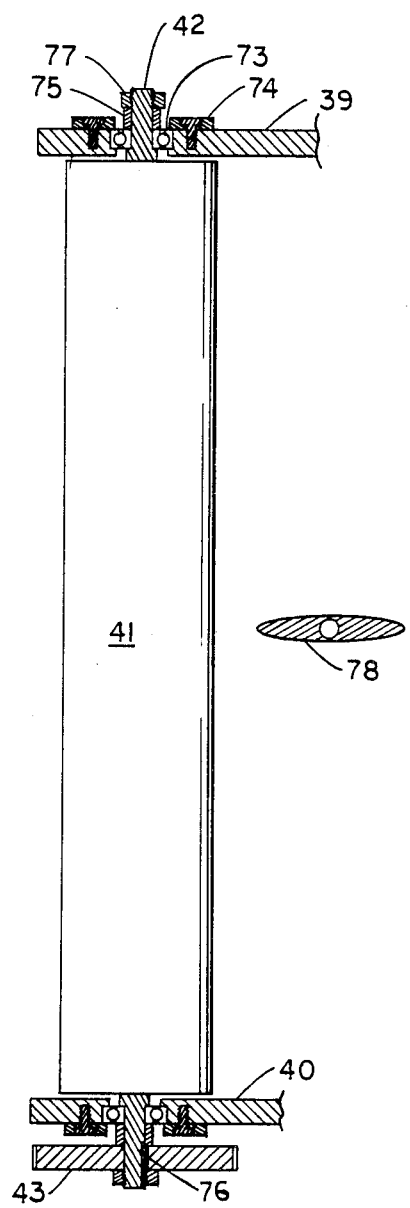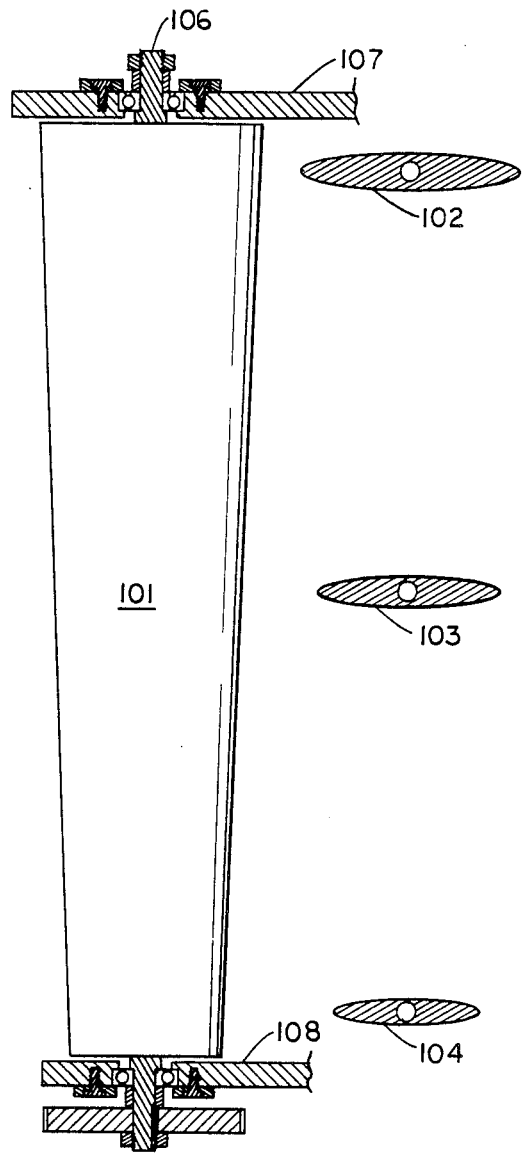

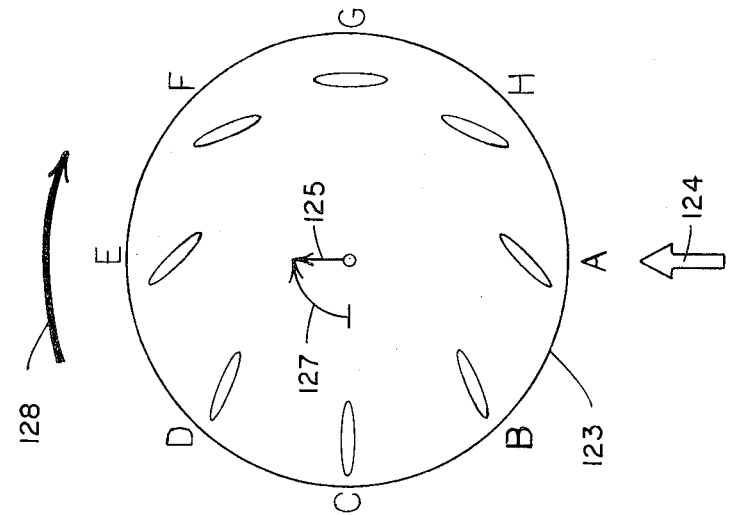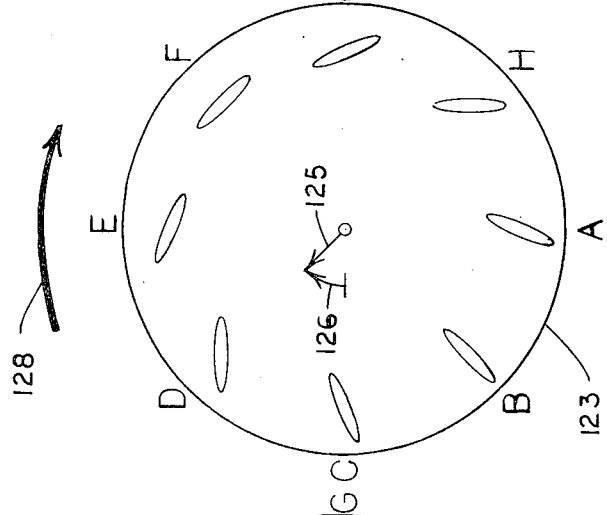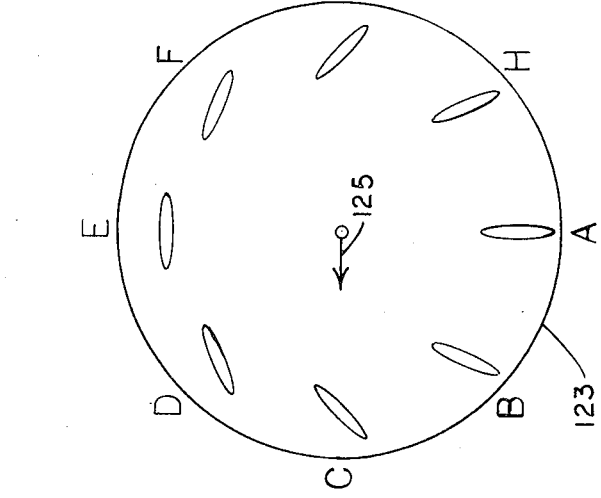

SYNCHRO-VANE VERTICAL AXIS WIND POWERED GENERATOR

TECHNICAL FIELD OF THE INVENTION

This invention relates generally to vertical axis wind powered generators and means for increasing and controlling the aeodynamic forces developed by such vertical axis wind powered generators.

BACKGROUND ART

For centuries various types of wind power generators have been built to convert the kinetic energy of the wind into useful energy or power. In recent years many worthwhile wind generators have been built utilizing the latest developments in aerodynamics, products and manufacturing methods. These wind generators are generally classified as either horizontal or vertical axis machines.

Horizontal axis machines have been built from small sizes, such as farm windmills, to much larger sizes such as the 200 kilowatt machine at Clayton, N. Mex. which has a rotor 125 feet in diameter. Such horizontal axis machines utilize aerodynamic lift forces to cause rotation of their vanes or airfoils and generate their maximum power when the vanes are traveling at 2 to 16 times the speed of the wind. Even with this high vane speed, a large horizontal axis machine usually utilizes a gear box in order to drive an electrical generator at a higher and synchronous speed, such that output frequency of the generated power may be synchronized with, and electrically connected to, a 60 cycles per second power system. Because of the necessity to drive the electrical generator at its synchronous speed, and simultaneously control the amount of power developed by the rotor of the wind generator, such a large wind generator is usually equipped with a vane pitch control mechanism to control the angle of attack of the vanes with respect to the wind. Also, such a large wind generator is usually equipped with a yaw control mechanism to keep the entire rotor facing into the wind. An important additional purpose of these two control mechanisms is to slow down or stop the rotor, and thus prevent damage attributable to over-speed, if excessively high winds should occur. Since the rotor mechanism, gear box, pitch and yaw control mechanisms must be mounted upon a structure sufficiently high that the rotor vane tips will clear the ground, it is quite evident that such a large horizontal axis wind generator can be quite complicated and expensive to build.

Vertical axis wind generators are generally sub-classified as either drag or lift type machines depending upon whether their rotor vanes utilize drag forces or aerodynamic lift forces to cause rotor rotation. A drag type machine harnesses the component of the wind force perpendicular to the surfaces of its vanes, similarly to the manner in which a flat object held perpendicular to the wind is pushed along by the wind. The rotor vanes of drag type machines are usually oriented relatively flat to the wind while they are traveling in the direction of the wind and producing power and are oriented parallel to the wind while they are traveling against the direction of the wind so as not to seriously impede power generation. The rotors of such machines generally have low energy conversion efficiencies since only the vanes which are traveling with the wind are contributing rotary force or power while those vanes which are traveling against the wind are hindering rotor rotation and power generation. An example of a drag type vertical axis wind generator is shown in Crehore U.S. Pat. No. 4,184,084. A particular disadvantage of a typical drag type wind generator is that it develops its maximum useable power at a low rotary speed of its rotor, typically while the rotor vanes are traveling at one-third to one-half the speed of the wind, thus it is usually necessary to use a gear box with a greater speed ratio in order to obtain higher output speeds. Although drag type wind generators have the advantage of being self-starting, control of their speed while they are operating under varying wind speed conditions, or to prevent over-speeding when high winds occur, can be quite difficult.

Lift type vertical axis wind generators have rotors with airfoil shaped vanes which utilize aerodynamic lift forces to cause rotor rotation, and thus generate their maximum power while the vanes are traveling at 2 to 16 times the speed of the wind. The aerodynamic lift forces and vane speed range for maximum power generation are similar to those previously described for horizontal axis wind generators. However a vertical axis wind generator has a rotor which revolves about a vertical axis, thus its vanes travel in an orbital manner about the vertical axis. Consequently the vanes are effectively traveling with the wind during one-half of each revolution of the rotor and are effectively traveling against the wind during the other one-half of each revolution of the rotor. Many problems have been encountered with vertical axis lift type machines which have limited their widespread use. For example, since their airfoil shaped vanes travel at a relatively high rate of speed and their vanes must continuously be oriented at an effective angle of attack with respect to the wind, they are difficult to control under varying or gusty wind conditions. Fixed-vane machines such as the "eggbeater style" Darrieus wind power generator, as described in The Wind Power Book by Jack Park, are easily stalled when overloaded or in the event of a sudden increase in wind speed while a load is applied to the rotor. Also, this type of rotor normally is not self-starting and must be accelerated by another power source up to a speed at which the vanes become sufficiently effective to cause self-acceleration of the rotor. Variable-pitch vane machines have been developed to overcome these problems, such as the Giromill which was undergoing development tests in 1982 at the Rocky Flats Wind Energy Research Center near Golden, Colo. There are many patented devices for the purpose of vane pitch control involving cams, linkages and servo-mechanisms. The two principal purposes of these devices are, firstly, to make the rotor self-starting and, secondly, once the rotor is up to its normal operating speed, to control the angle of attack of each vane in a cyclical manner such as by rocking each vane back and forth during each revolution of the rotor, so as to optimize the aerodynamic lift force developed by each vane during each complete revolution of the rotor. Since it is necessary to control all of the vanes simultaneously, such multi-vane cyclical devices can be complicated, expensive and subject to breakdown. Thus there remains a need for an inexpensive, reliable and effective means for vane pitch control on lift type vertical axis wind generators.

Although each of the above described machines, and patents referred to herein, describe machines for producing useable power from the wind, none of them have been able to produce power on an economically feasible basis. Each of them has one or more deficiencies which are partly attributable to the unpredictability of the wind, and partly due to the construction and consequent wind energy conversion characteristics of the wind generator itself.

One apparent advantage a vertical axis wind generator has, as compared to a horizontal axis wind generator, is that its vertical power shaft may be more conveniently coupled to a load device, such as an electrical generator, which is located near the ground rather than upon a high structure. Another apparent advantage is that its own shaft also acts as its principal support structure, thus eliminating the need for a separate support structure at many wind generator installation sites.

SUMMARY OF THE INVENTION

A vertical axis wind generator has other non-apparent advantages, and it is an object of this invention to provide a vertical axis wind generator with new and valuable features which are sufficiently different from what has been used or described before so that it may be said that they have been unobvious to a person having ordinary skill in the area of technology related to wind generators. Since these new features, included as embodiments of the structure of this invention, are so dependent upon the characteristics of the wind, or air flow, it is necessary to describe these characteristics.

When wind flows past in airfoil shaped vane, which is oriented at a small angle of attack with respect to the wind approaching the airfoil, there is a pressure developed on one side of the vane and a vacuum developed on the other side of the vane. This difference in pressure, from one side of the vane to the other side, causes aerodynamic "lift" forces on the vanes which in turn cause the wind machine's rotor to rotate. This same difference in pressure, from one side of the vane to the other side, would cause some of the wind to escape past the ends of the vanes, and therefore not cause the desired aerodynamic forces on the sides of the vanes, if it were not prevented from doing so. By providing this wind generator's rotor with impervious top and bottom support plates and flat ended vanes, such that the ends of the vanes are located close to the inner surfaces of the top and bottom support plates, the flow of the wind between the ends of the vanes and the support plates is limited and the wind is forced to flow past the sides of the vanes, thus improving the energy conversion efficiency of the rotor.

Another characteristic of the wind is that it tends to take the path of least resistance. Thus the wind which flows past the windward vanes of a rotor, and enters the interior of the rotor, would naturally tend to partially by-pass the leeward vanes of a rotor having open arm type vane supports, by flowing upward and downward past the arms, rather than past the sides of the vanes, as it continues to flow out from the interior of the rotor. Again, by providing the rotor of this invention with impervious top and bottom support plates, the wind which has entered the interior of the rotor is prevented from by-passing the leeward vanes and is forced to flow outwardly past the leeward vanes, thus again utilizing impervious support plates to improve the energy conversion efficiency of the rotor still further.

Therefore providing this invention with impervious top and bottom support plates provides two separate and distinct means for improvement of the energy conversion efficiency of this invention: firstly, by limiting the flow of the wind between the ends of all vanes and the support plates and, secondly, by forcing the wind which has flowed past the windward vanes and entered the interior of the rotor to also flow past the leeward vanes as it flows outwardly from the interior of the rotor.

Accordingly, an object of this invention is to provide a vertical axis wind generator which has a rotor consisting of a multitude of airfoil shaped vanes, each vane attached to its own central shaft, and all vane shafts mounted vertically and evenly spaced on circles of rotation which are concentric with the wind generator's vertical axis, and all vane shafts rotatably supported by impervious and circular top and bottom support plates in such a manner that the support plates also direct the wind so as to provide two separate and distinct means whereby the rotor of this invention is enabled to develop increased wind energy conversion efficiency.

It is also an object of this invention of provide a positive and synchronous means of vane orientation which in a preferred embodiment utilizes low friction gears and in another embodiment utilizes timing belts and timing pulleys. The preferred embodiment includes vane gears attached to the vane shafts, idler gears rotatably mounted on short support shafts which are attached to the rotor's support plate, a normally stationary orientation gear mounted on and attached to a normally stationary but incrementally adjustable orientation spindle which with its attached orientation gear is mounted concentrically with the wind generator's vertical axis such that incremental adjustment of the normally stationary but incrementally adjustable orientation spindle with respect to the wind will simultaneously and incrementally adjust the orientations of all of the vanes with respect to the wind, and such that the orientation spindle is adjustable by means exterior to the rotor and thus remains fully adjustable regardless of whether the rotor is stationary or rotating. The term "normally stationary" is applicable only under constant wind generator operating conditions, such as constant power output and constant wind velocity and direction, thus may apply for only short periods of time when the wind generator is operating.

It is another object of this invention to provide airfoil shaped vanes which are capable of efficiently converting wind energy into both lift and drag type forces, during each revoluting of the rotor, such that a summation of the instantaneous forces contributed by all of the vanes, at any instant in a revolution of the rotor, results in the wind generator having continuous and desireable torque and power generating characteristics.

It is another object of this invention to provide airfoil shaped vanes, each of which will efficiently convert wind energy into drag type forces when the wind is approaching either side of the vane, and into lift type forces when the wind is approaching either tip of the vane within reasonable angles of attack.

It is another object of this invention to provide a wind generator which is self-starting and which will generate power equally well in either direction of rotation and which is completely controllable, by incremental adjustment of its orientation spindle, from stand-still to maximum desired speed, for a particular wind speed then prevailing, in either direction of rotation.

It is another object of this invention to provide a means for coupling a driven machine, such as an electrical generator, to the wind generator's rotor.

It is another object of this invention to provide an adjustment means, with the adjustment means located exterior to the rotor, whereby the orientation spindle may be either held stationary or may be incrementally adjusted so as to orient the rotor's vanes so as to cause the rotor to rotate in the desired direction of rotation, and so as to control the rotary speed and power output of the rotor, and whereby the adjustment means may be adjusted either manually or by an orientation servo-mechanism which, in turn, may be controlled by many types of commonly used electrical instruments such as voltage, current, frequency and phase sensing instruments and by electrical devices such as anemometers, wind direction sensors, rectifiers, batteries, relays and computers.

It is another object of this invention to provide an orientation spindle position indicating device which is caused to rotate with the spindle so as to remotely indicate the orientation spindle's angular position.

A natural characteristic of the wind is that lowest wind velocities occur near the ground and highest wind velocities occur at considerable heights above the ground. As an example, within reasonable heights for wind generators, when the wind is blowing at 20 miles per hour near the ground it could also be blowing at 30 miles per hour at a height 100 feet above the ground. Because the kinetic energy of the wind is proportional to the square of its velocity, it is advantageous for a wind powered generator to be able to convert the higher velocity wind energies at heights above the ground, and simultaneously convert the lower velocity wind energies near the ground, into useful energy or power.

Accordingly, another object of this invention is to provide a vertical axis wind powered generator with a new embodiment consisting of a rotor which extends a practical distance above the ground and which is larger in diameter at the top than at the bottom of the rotor, and with vanes which have their shafts tilted outward to a larger circle of rotation at the top of the rotor than at the bottom of the rotor, so as to enable the vanes to efficiently convert higher velocity wind energies at the top of the rotor, and simultaneously and as efficiently convert lower velocity wind energies at the bottom of the rotor, into rotary forces and thus cause the rotor and rotate and produce useful energy and power.

An additional object of this embodiment of this invention is to provide the rotor with tapered vanes which have a greater chord length at the top ends of the vanes than at the bottom ends of the vanes, so as to increase the area of vanes at the top of the rotor in proportion to the larger circle of rotation at the top of the rotor so as to increase the power output of this invention still further in proportion to the increased vane area.

To establish the wind powered generator's ratio of diameters, of the top circle of rotation compared to the bottom circle of rotation, it will be necessary to determine, using anemometers, the average ratio of natural wind speeds, at the intended rotor top height and the intended rotor bottom height, prevailing at the site where the wind powered generator is to be installed. The object of establishing this ratio is so that the vanes will then be traveling at close to the same percentage of the naturally prevailing wind speeds, both at the rotor's top height and at the rotor's bottom height, so that the wind powered generator's rotor may be designed such that each vane will have close to the same angle of attack with respect to the approaching wind, both at the top end and at the bottom end of each vane. It is realized that angle of attack variations will occur due to the variations in wind flow which occur naturally at any wind powered generator installation site, however such variations are within the wind energy conversion capabilities of this invention.

DESCRIPTION OF THE DRAWINGS

FIG. 2 is a cross-section, through section 2 of FIG. 1, showing vane oientation gearing and how the vanes are oriented during rotor assembly.

FIG. 3 is an expanded vertical cross-section, through section 3 of FIG. 2, not including vanes, vane shafts and vane gears, a rotor with a stationary mainshaft.

FIG. 4 is a vertical cross-section, similar to FIG. 3, showing a rotor attached to a rotating mainshaft.

FIG. 5 shows a typical non-tapered vane mounting arrangement and its airfoil shape.

FIG. 6 shows a typical tapered vane mounting arrangement and its tapered airfoil shape.

FIGS. 15, 16 and 17 are operational diagrams for use in explaining the operation and control of this invention.

DESCRIPTION OF THE PREFERRED EMBODIMENTS

Figure 1:
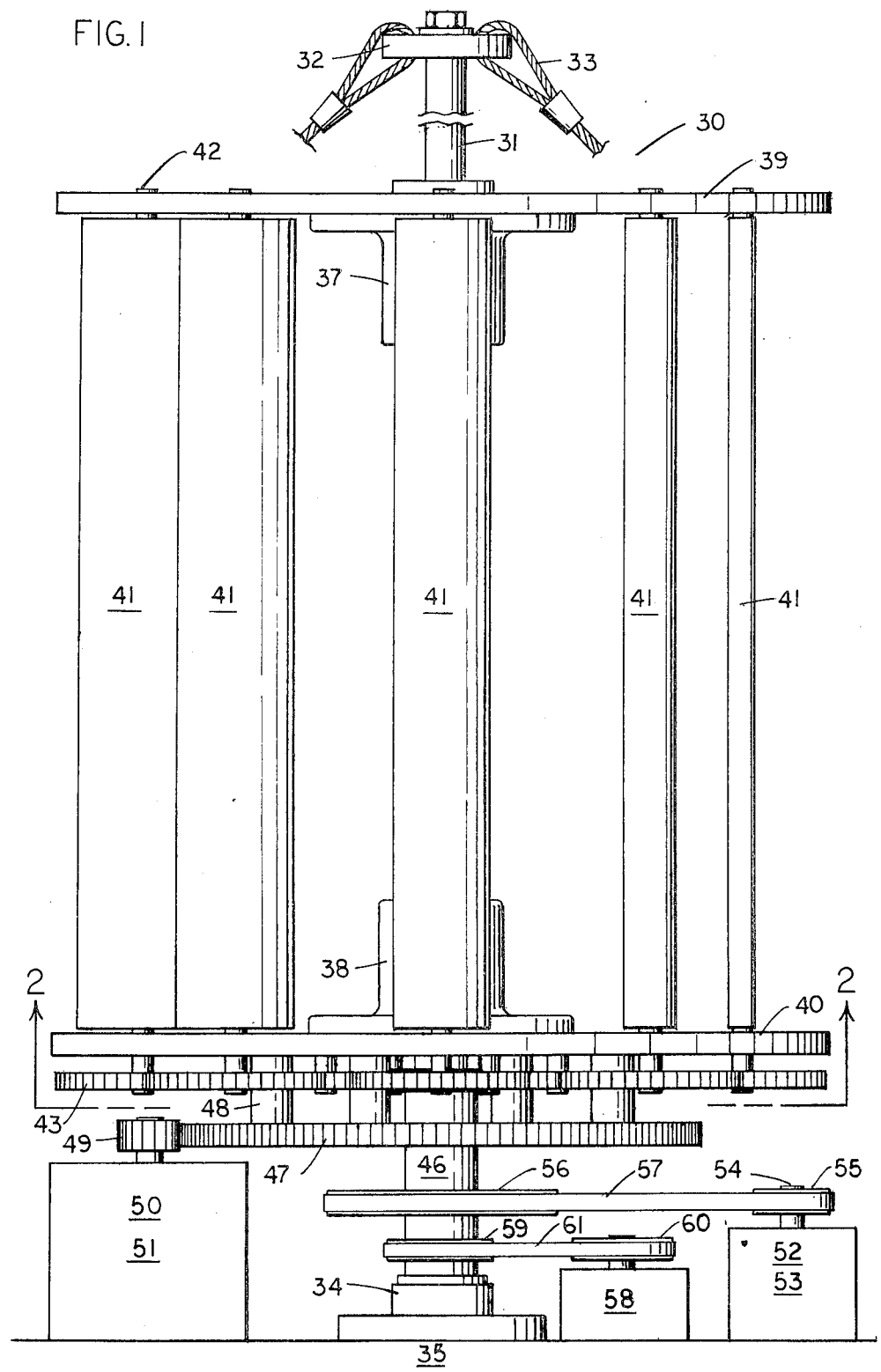
FIG. 1 is a side view of an embodiment of this invention.

FIG. 1 is a side view of this Synchro-Vane vertical axis wind powered generator having a rotor 30 which rotates about a mainshaft 31 which is supported at the top by a guy cable assembly 32 and three or more guy cables 33, and the bottom of the mainshaft is positioned and supported by a mainshaft base 34 which is accurately mounted and attached to the wind generator's support structure 35 which may be located near, or at some distance above ground level. The rotor 30 consists of a spacer tube 36 (refer to FIG. 3) welded to a top rotor hub 37 and a bottom rotor hub 38 and the hubs are accurately machined so as to accurately and firmly position the rotor's top support plate 39 with respect to the rotor's bottom support plate 40. The airfoil shaped vanes 41 are in turn supported by the rotor's top and bottom support plates by means of the vane shafts 42 to which the vanes are firmly attached but which are rotatably mounted within bearings which are attached to both the top and bottom support plates and the bearings are evenly spaced on a top circle of rotation at the top of the rotor and the bearings are evenly spaced on a bottom circle of rotation at the bottom of the rotor such that the vane shafts are parallel, or nearly parallel, with each other and such that top and bottom circles of rotation have equal, or nearly equal, diameters and such that the circles of rotation are concentric with the wind generator's axis. Preferably the top and bottom support plates 39 and 40 are made of an impervious material and the ends of the vanes 41 are located close to the inner surfaces of the top and bottom support plates so as to limit the flow of the wind between the ends of the vanes and the support plates and force the wind to flow past the sides of the vanes and thus provide a first means for improving the energy conversion efficiency of this wind generator. Also the top and bottom support plates are preferably made of impervious material so that the wind which has flowed past the windward vanes and entered the interior of the rotor is prevented from bypassing the leeward vanes, by flowing upward or downward out of the rotor's interior, and is forced to flow outward past the leeward vanes and thus provide a second means for improving the energy conversion efficiency of this wind generator. The top support plate 39 and bottom support plate 40 are preferably made of a solid light weight material such as aluminum. However the support plates may alternatively be made of pervious construction, such as utilizing steel or aluminum plates with large open areas, or holes, to reduce their weights, so long as their inner surfaces, or closest surfaces to the ends of the vanes 41, are made of impervious material such as thin sheet metal.

In accordance with this alternative embodiment of this invention, in which the support plates 39 and 40 are support plates with large open areas to reduce their weights, the open areas allow wind to flow through and thus the support plates are pervious, but with the inner surfaces of the pervious support plates made of impervious material such as thin sheet metal, the support plates 39 and 40 remain impervious even though they are an assembly of pervious support plates and impervious thin sheet metal.

A further embodiment of this invention, in which the support plates have large open areas, without impervious surface material, will provide a wind generator which will convert wind energy into useful energy, however without employing either of the separate and distinct means, as described, for improving the energy conversion efficiency of this invention. This further embodiment may also have a rotor constructed with radial arms to support the vane shafts 42, so as to utilize readily available structural aluminum or steel beam shapes in constructing the arms.

A still further embodiment employs only the first means, without the second means, for improving the energy conversion efficiency of this invention.

Figure 19:
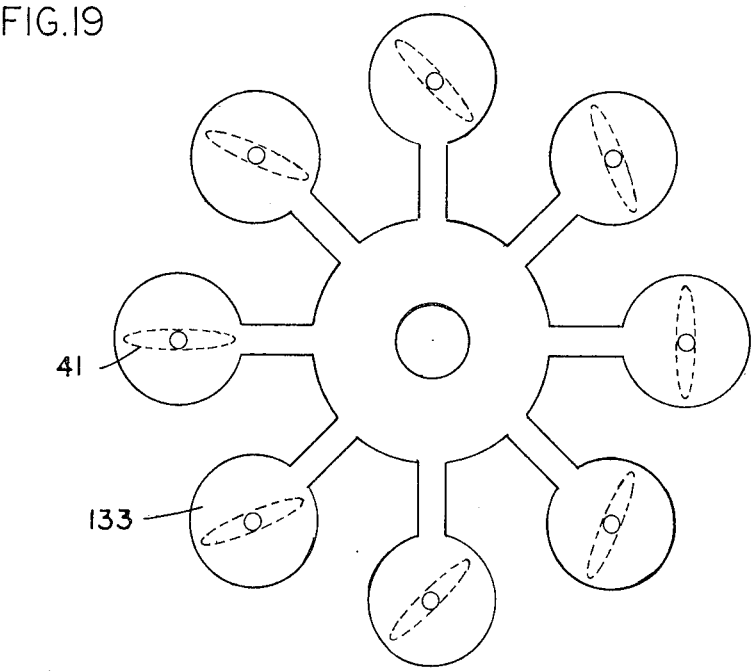
FIG. 19 illustrates how support plates are constructed to provide a first means for improving the energy conversion efficiency of this invention.

FIG. 19 illustrate how open type support plates 133 are constructed so as to provide only the first means. In this view, the ends of the vanes 41 are hidden behind circular areas of the open type support plates 133 and thus are shown with dashed lines, and the ends of the vanes are located close to the impervious circular areas. Thus the flow of the wind, between the ends of the vanes and the circular areas, is limited so as to provide only the first means for improving the energy conversion efficiency of this invention.

Another still further embodiment employs only the second means, without the first means, for improving the energy conversion efficiency of this invention.

Figure 20:
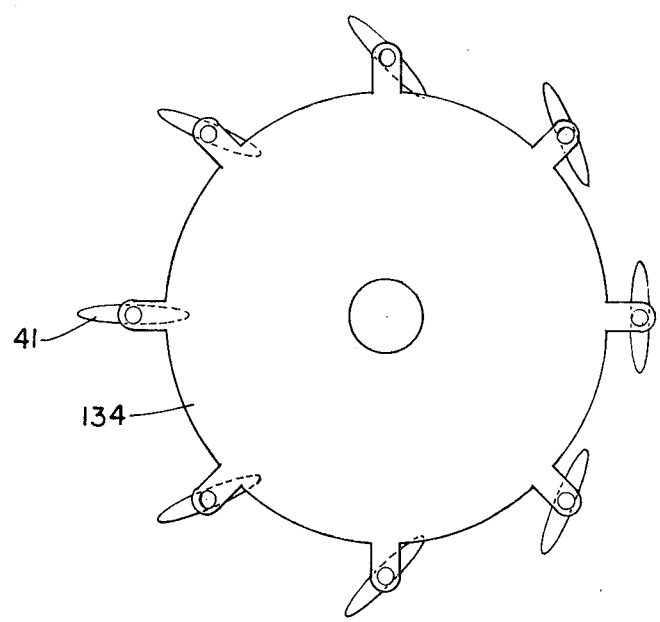
FIG. 20 illustrates how support plates are constructed to provide a second means for improving the energy conversion efficiency of this invention.

FIG. 20 illustrates how partially open support plates 134 are constructed, so as provide only the second means. In this view, the ends of the vanes 41 are partially visible behind the partially open type support plates 134, which have short radial arms to support the vane shafts and the ends of the vanes are located a relatively small distance away from the partially open type support plates, but not so far away from the support plates that the wind forcing effect of the partially open support plates is substantially reduced. Thus the wind, which has flowed past the windward vanes into the interior of the rotor, is forced to also flow outwardly past the leeward vanes so as to provide only the second means for improving the energy conversion efficiency of this invention.

In accordance with the above descriptions of the several embodiments of this invention, such embodiments are employable either separately or in any combination so as to provide: neither means; the first means without the second means; the second means without the first means; both the first and the second means for improving the energy conversion efficiency of this invention. This latter embodiment, providing both means, is the preferred embodiment and therefore the drawings, other than FIGS. 19 and 20, show only impervious support plates, referred to simply as support plates unless stated otherwise.

Again referring to FIG. 1, vane gears 43, attached to the bottom ends of the vane shafts 42, mesh with idler gears 44 (please refer to FIGS. 2 and 3) which are rotatably mounted to, and supported by, the rotor's bottom support plate 40. The rotatably mounted to, and supported by, the rotor's bottom support plate 40. The idler gears 44, all mesh with a normally stationary, but incrementally adjustable, orientation gear (refer to FIG. 3) which is firmly attached to the orientation spindle 46. The orientation gear 45 has exactly one half the pitch diameter of the pitch diameter of each vane gear 43 and thus the orientation gear has exactly one half the number of gear teeth of the number of gear teeth on each vane gear. Thus one revolution of the orientation gear will cause a vane to rotate one half a revolution.

The idler gears may have a pitch diameter and number of teeth to suit the dimensions of the rotor design, because the idler gears do not effect the gear ratio between the orientation gear and the vane gears. Vane orientation utilizing gearing as the preferred embodiment is based upon the small amount of power consumed by gearing as compared to other orientation means, such as by use of timing belts and timing pulleys, although such other means are useable with less efficiency. When wind flows past an airfoil the center of pressure is normally located approximately one quarter of the chord length (distance from tip of tail of the vane) from the tip of the vane. Thus, when this wind generator is operating, the windward vanes are attempting to rotate, due to the torque developed by the center of pressure forces, in a direction which opposes rotor rotation, whereas the leeward vanes are attempting to rotate in a direction which aids rotor rotation, thus the two forces effectively cancel each other and result in a minimum power loss due to vane orientation. This is also partially due to the wind confining effect of the rotor's impervious top and bottom support plates which cause the wind to flow past the leeward vanes as effectively as when the wind flows past the windward vanes. Even though the power consumption due to vane orientation is small, there is power consumed due to friction between the gear teeth and by rotary friction in the moving parts. However, due to the low torque required for vane orientation, the gears may have a relatively small face width and also may be of relatively light weight construction.

The power output of this wind generator is by means of a main drive gear 47, attached to the rotor's bottom support plate 40, by means of drive gear spacers 48, which drives a driven gear 49 which is attached to the shaft of a driven machine such as an electrical A.C. or D.C. generator 50. Preferably a remotely indicating tachometer 51 is attached to the electrical generator's rotating element so as to indicate the electrical generator's rotary speed and thus also indicate the rotary speed of the wind generator's rotor. Located on the wind generator's support structure 35 near the orientation spindle 46 is an orientation servo-mechanism 52. In its preferred embodiment the orientation servo-mechanism 52 consists of an A.C. or D.C. motor and worm gear reducer with a gear ratio which will turn the servo-mechanism's output shaft 54 at a slow speed and in small angular increments in either direction, and which, due to its large speed reduction by means of a worm gear, will hold its output shaft 54 in a fixed position when its motor is not operating. Also in its preferred embodiment the orientation servo-mechanism 52 will have a combination solonoid and manually operated clutch 53 which, when operated, will disengage the servo-mechanism's gear reducer from its output shaft 54 thereby allowing the output shaft 54 to rotate freely in the event that it should become necessary to stop the wind generator's rotor 30 and prevent it from rotating, or to place the wind generator into an inoperable condition. Solonoid operation of the clutch 53 is primarily intended to provide for remote control of the wind generator. Manual operation of the clutch allows on site personnel to use a hand crank on the end of the output shaft 54 to manually control the wind generator and simultaneously disable the remote clutch control.

Preferably the orientation servo-mechanism's output shaft 54 is coupled to the orientation spindle 46 by means of a drive sprocket 55, a driven sprocket 56 and a cog belt 57 so as to provide positive incremental positioning of the wind generator's orientation gear. Also located on the wind generator's support structure 35 near the orientation spindle is an orientation gear position indicating device 58 which is caused to rotate by the orientation spindle 46 by means of a drive pulley 59, a driven pulley 60 which has the same pitch diameter as the drive pulley, and a timing belt 61. Preferably the orientation gear position indicating device 58 is an electro-mechanical device, such as a Bendix Sel-Syn sending unit, which is electrically connected to a remotely located Sel-Syn receiving unit which will indicate the angular position of the sending unit, and thus indicate the angular position of the orientation gear 45.

FIG. 2 is a bottom view, through section 2 of FIG. 1, showing the preferred vane orientation gearing arrangement. The vane gears 43, idler gears 44 and orientation gear 45 are shown as pitch circles with the gear teeth omitted. In this view the vanes 41 are hidden behind the rotor's bottom support plate 40 and are shown with dashed lines so as to indicate how the vanes are oriented when the wind generator is assembled.

In this embodiment there are eight vanes 41 and vane gears 43, four idler gears 44, with each idler gear meshed with two vane gears, 43 and one orientation gear 45 meshed with all four idler gears 44. While eight vanes are shown in this embodiment, and are sized in relative proportion to the diameter of the rotor, a greater or lesser number of vanes may be utilized, or wider or narrower vanes may be utilized, depending upon the rotor's diameter and the relative costs of manufacture for a particular wind generator design. In FIG. 2 please note that clockwise incremental rotation of the normally stationary orientation gear 45 causes counter clockwise rotation of the idler gears 44 which in turn cause clockwise rotation of the vane gears 43 and vanes 41. Thus, clockwise incremental rotation of the orientation gear 45 causes all of the vanes 41 to rotate clockwise but by half the angular amount due to the 2:1 ratio between the orientation gear 45 and the vane gears 43.

FIG. 3 is an expanded vertical sectional view through section 3 of FIG. 2, showing the wind generator's preferred structure in greater detail. The mainshaft 31 is supported by the mainshaft base 34 and is prevented from turning by the mainshaft key 62. On top of the mainshaft base is a bronze washer 63 and a bronze sleeve 64 which is slightly longer than the steel orientation spindle 46 which is internally machined to a slightly larger diameter than the outside diameter of the sleeve 64 so that the orientation spindle 46 is supported by the washer 63 and can rotate about the sleeve 64. A thrust washer 65, mounted on top of sleeve 64, supports the inner race of a spherical roller type lower rotor bearing 66. The rotor's bottom support plate 40 and bottom rotor hub 38 are bored to fit the lower rotor bearing's outer race. The bottom support plate 40 is bolted to the bottom rotor hub 38. The bottom rotor hub 38, spacer tube 36 and top rotor hub 37 are welded into an assembly before final machining of the rotor support plate mounting surfaces. The top rotor hub 37 and top support plate 39 are bored to fit the outer race of the upper rotor bearing 67. The rotor's top support plate 39 is lowered into place, while the vanes (not shown) are held with their shafts protruding through the vane bearing holes in the top and bottom support plates, and bolted to the top rotor hub 37. An upper rotor bearing retainer plate 68 is bolted to the rotor's top support plate 39 so as to hold the outer race of the upper rotor bearing 67 in place. Also an upper rotor bearing sleeve 69 is fastened to the mainshaft 31 by means of set screws so as to prevent the rotor from lifting off its lower bearing 66, although this is not likely to occur. The idler gears 44, with pressed in idler bearings 70, are mounted on stub shafts 71 previously welded to the rotor's bottom support plate 40 and ar held on the shafts by means of idler shaft nuts 72 which are tightened and then prevented from loosening by means of set screws. The orientation spindle 46 is a welded assembly with the orientation gear 45 located at the top and the servo-mechanism driven sprocket 56 and position indicating device drive pulley 59 located as required for the particular installation.

FIG. 5 is an illustration of the mounting arrangement of a solid type non-tapered vane 41 with an elliptically and symmetrically shaped cross-section 78. This solid type non-tapered vane is also applicable to larger wind powered generator's of this invention with tilted vane shafts as described later. With the vane shafts 42 protruding through the vane bearing holes in the rotor' top support plate 39 and bottom support plate 40, the vane bearings 73 are installed on the vane shafts, and into the bearing bores of the top and bottom support plates, and the outer races of the bearings are held in place by vane bearing retainer plates 74 attached to the upper and lower support plates by means of bolts. Vane shaft sleeves 75 are placed on each end of the vane shafts then vane shaft nuts 77 are screwed on to the top ends of the vane shafts 42 and are prevented from loosening by means of set screws. With the vanes 41 held in their proper orientation, as illustrated in FIG. 3, the vane gears 43 and vane gear keys 76 are installed, with the vane gear teeth meshed with the idler gear teeth, and the vane shaft nuts 77 are screwed on to the bottom ends of the vane shafts 42 and are prevented from loosening by means of set screws. Vanes with a non-tapered cross-section as illustrated by cross-section 78 of FIG. 5 are the preferred embodiment for wind generators with relatively short rotors.

FIG. 4 is an expanded vertical sectional view, similar to FIG. 3, describing an alternative embodiment of this invention in which the mainshaft 79 rotates with and becomes a part of the rotor 80. This embodiment is the preferred embodiment for larger wind generators because it facilitates main bearing replacement, and because it allows the main drive gear to be located near the bottom of the main shaft so that the wind generator may be more conveniently coupled to a driven machine such as an electrical A.C. or D.C. generator. In this embodiment the mainshaft base 81 is equipped with a spherical roller type bottom thrust bearing 82, a bottom thrust washer 83 and a spherical roller type bottom radial bearing 84. This arrangement of bearings is self-aligning and thus the bearings will operate with normal life even though the rotor's mainshaft 79 may be slightly tilted due to the uneven tension in the guy cables 33. Located on top of the bottom radial bearing's inner race is a main gear support washer 85 which supports the main drive gear 86 which is locked to the mainshaft 79 by means of main drive gear key 87. Located on top of the main drive gear's hub is an orientation spindle support washer 88 which supports the inner race of the lower spindle bearing 89 which in turn supports and positions the orientation spindle 90. The outer race of the upper spindle bearing 91 is supported by the orientation spindle. Located on top of the inner race of the upper spindle bearing 91 is a spindle spacer washer 92 which does not bear rotor weight but prevents the orientation spindle 90 from contacting the rotor's bottom support plate 40. The construction of the rotor is similar to the construction described for FIG. 3 except that the upper and lower rotor bearings are eliminated and the upper rotor hub 93 and lower rotor hub 94 are permanently attached to the mainshaft 79. In this embodiment the guy cable housing 95 is equipped with a spherical roller type top thrust bearing 96, a top thrust washer 97, two ball type top radial bearings 98, a top spacer bushing 99, and a top bearing retainer plate 100 bolted to the guy cable housing 95. The three or more guy cables 33 are attached to the guy cable housing 95 at their top ends and are firmly attached to anchor bolts buried in the ground at their bottom ends.

Figure 14:
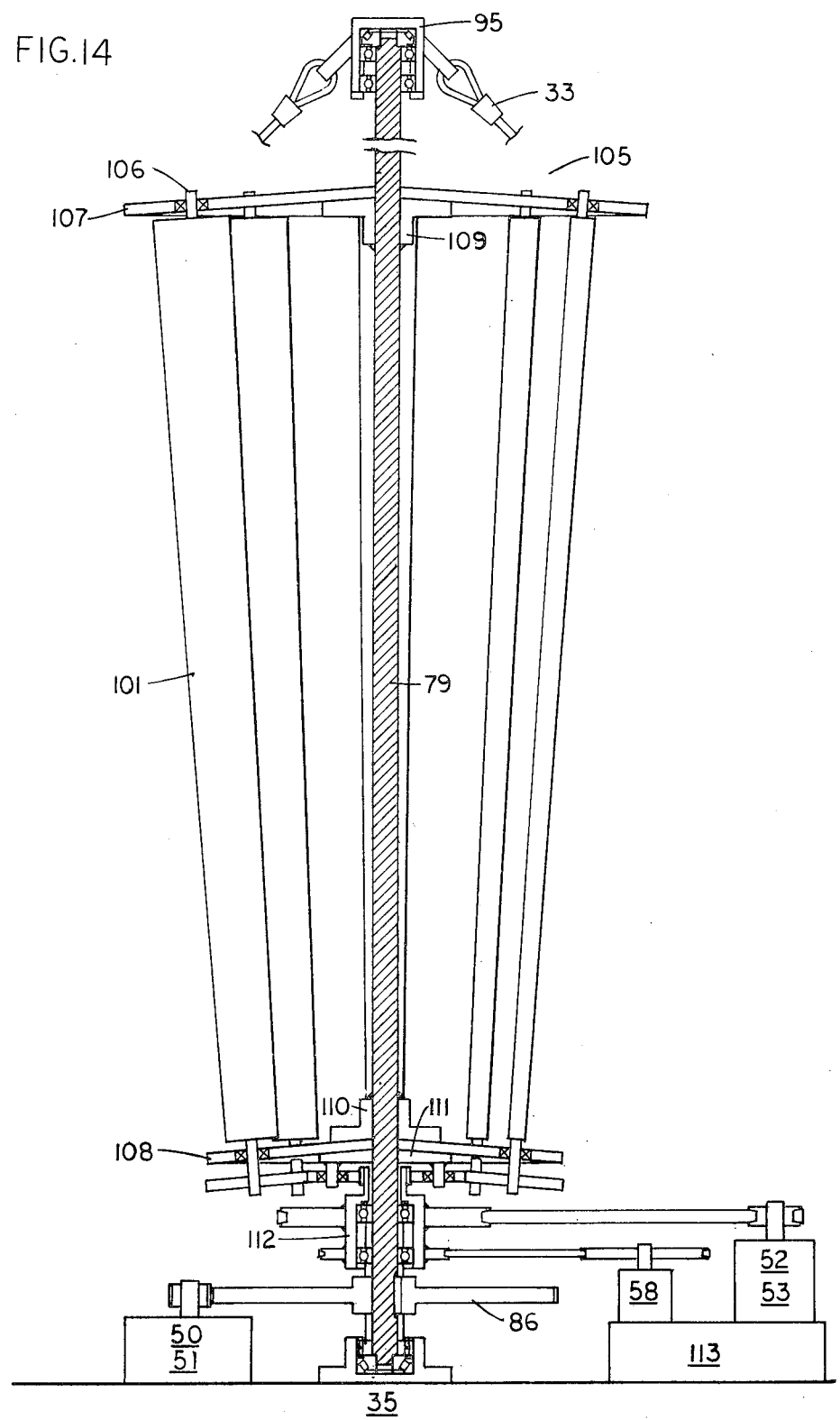
FIG. 14 is a vertical cross-section of a tall wind generator with tilted and tapered vanes. Since the details of this large wind generator are very small in this drawing, the cross-hatching of cross-sections has been omitted for clarity.

FIG. 14 is a side view, showing a cross-section, of a very large Synchro-Vane wind powered generator with a rotating mainshaft. This embodiment is the preferred embodiment for wind generators built reasonably high to take advantage of the greater wind velocities which naturally occur at reasonable distances above the ground. This embodiment has tapered vanes 101 with the vane shafts 106 tilted outward to a larger circle of rotation at the rotor's top support plate 107 than their circle of rotation at the rotor's bottom support plate 108. Assuming that the rotor extends from 10 feet above the ground to 100 feet above the ground, and assuming that the wind speed is 20 MPH 10 feet above the ground and is 30 MPH 100 feet above the ground, then the wind generator's vane shafts 106 would be tilted to a circle of rotation at the top of the rotor which is 1.5 times the diameter of the circle of rotation at the bottom of the rotor. Thus, when the wind generator's rotor 105 is rotating, the vanes 101 both at the top of the rotor and at the bottom of the rotor will be traveling at the same percentage of the prevailing wind speeds at the top and at the bottom of the rotor. Thus each vane will be operating at the same angle of attack, with respect to the wind approaching each vane, both at the top and at the bottom of each vane and the airfoil shaped vanes will be developing aerodynamic lift and drag type forces equally well at both the top and the bottom of the rotor. Since the horsepower developed by a wind powered generator is proportional to the cube of the wind velocity, or speed, and the wind speed at the top of the rotor is assumed to be 1.5 times the assumed wind speed at the bottom of the rotor, each square foot of vane area, on the side of each vane, at the top of the rotor theoretically will develop 3.375 times the horsepower developed by each square foot of vane area at the bottom of the rotor, and this 3.375 power increase factor is attributable only to the higher wind speeds which naturally occur at heights above the ground as compared to the naturally and simultaneously occuring lower wind speeds near the ground. Since this 3.375 power increase factor is applicable to high wind generators of this invention which have either tapered or non-tapered vanes, and since the preferred embodiment of this high, or tall, wind generator includes tapered vanes, another embodiment of this invention is a tall wind generator with a rotor which has tilted vane shafts and non-tapered vanes.

While FIG. 14 illustrates this tall wind generator with a rotating mainshaft 79, another embodiment of this invention includes a rotor which rotates about a stationary mainshaft, similarly to the arrangement of FIGS. 1 and 3 in which the rotor 30 rotates about the stationary mainshaft 31. Therefore, another embodiment of this invention includes a rotor which rotates about a stationary mainshaft with a rotor which has tilted vane shafts and tapered vanes. Still another embodiment of this invention includes a rotor which rotates about a stationary mainshaft with a rotor which has tilted vane shafts and non-tapered vanes.

Again referring to FIG. 14, the larger circle of rotation of the vane shafts at the top of the rotor makes it possible to use tapered vanes, which have a greater chord length at the top of the vane than the chord length at the bottom of the vane, without increasing the solidity ratio, or ratio of vane side area as compared to the rotor's frontal area, at the top of the rotor as compared to the bottom of the rotor. Since the horsepower developed by a vane, or airfoil, is proportional to the side area, or chord length, of a vane, and with the vanes at the top of the rotor having chord lengths 1.5 times the chord lengths of the vanes at the bottom of the rotor, theoretically each vertical linear foot of vane at the top of the rotor will develop 1.5 times the horsepower developed by each vertical linear foot of vane at the bottom of the rotor, and this further increase in horsepower is attributable only to the increased chord lengths of the vanes at the top of the rotor. This 1.5 power increase factor multiplied by the 3.375 power increase factor due to higher wind speed at the top of the rotor, means that; theoretically, each vertical linear foot of vane at the top of the rotor will develop 5.0625 times the horsepower developed by each vertical linear foot of vane at the bottom of the rotor. Therefore this preferred embodiment of this invention, with the vane shafts tilted and with tapered vanes, provides two means whereby the wind power generating capability of this invention is increased by a very worthwhile amount, and in which both said means may be employed simultaneously by this invention.

FIG. 6 is an illustration of a solid type tapered vane 101 utilized in this embodiment of this invention. The vanes are similar in construction and are installed in a similar manner to that described previously for non-tapered vanes in FIG. 5. However these tapered vanes 101 in FIG. 6 have a larger cross-section 102 at the top, a medium sized cross-section 103 in the middle, and a smaller cross-section 104 at the bottom, and are uniformly tapered from the top end to the bottom end of the vane. The cross-sections 102, 103, and 104 of this solid type tapered vane are elliptically and symmetrically shaped cross-sections.

Again referring to FIG. 14, this embodiment of this invention has a rotor 105 which has a top support plate 107 which is larger in diameter than the rotor's bottom support plate 108, and the support plates are preferrably made of an impervious material to provide the two means for improving the energy conversion efficiency of this invention as described in the "Summary of the Invention". Preferably the top and bottom support plates are formed conically so that their surfaces are perpendicular to the axial center-lines of the vane shafts 106. To accommodate the conical top and bottom support plates, the top rotor hub 109, the bottom rotor hub 110 and a bottom support hub 111 have their surfaces, which contact the support plates, machined conically to fit the support plates. Also this embodiment would preferrably utilize bevel type vane gears, idler gears, and a bevel typed orientation gear so as to accommodate the angularity between the vane gears and the orientation gear, although this may not be necessary for wind generators with vane shafts tilted only a small amount, due to the relatively low torque required for vane orientation as previously explained. Due to the larger diameter mainshaft needed for a very large wind powered generator and the use of a bevel type orientation gear, the orientation spindle 112 is of a somewhat different design as illustrated, however the vane orientation in this embodiment functions in the same manner as that previously described for smaller wind generators of this invention. Also due to the large size of this embodiment, the wind powered generator's support structure 35 is preferably located near ground level and the orientation servo-machanism 52 with clutch 53, and the position indicating device 58 are mounted on a raised structure 113. Also, since a larger driven machine 50, such as an electrical A.C. or D.C. generator, is required, the driven machine 50 is mounted below the wind generator's support structure 35 so that the main drive gear 86 may be positioned low on the mainshaft 79. FIG. 14 shows a guy housing 95 and guy cable 33 arrangement for hold this wind generator's mainshaft in a vertical position, however some potential wind generator sites have winds which flow predominantly from one direction such as at San Gorgonio Pass, East of Banning, Calif., thus making it practical to place several wind generators side-by-side in a row perpendicular to the prevailing wind. For such an installation it would be practical to erect a structure over the tops of the wind generators such that the structure would provide a mounting for the wind generator's top bearings and would hold the mainshafts in a vertical position more firmly than the guy cable arrangement. Also such a structure would allow access to the top mainshaft bearings of the wind generators.

Figure 11:
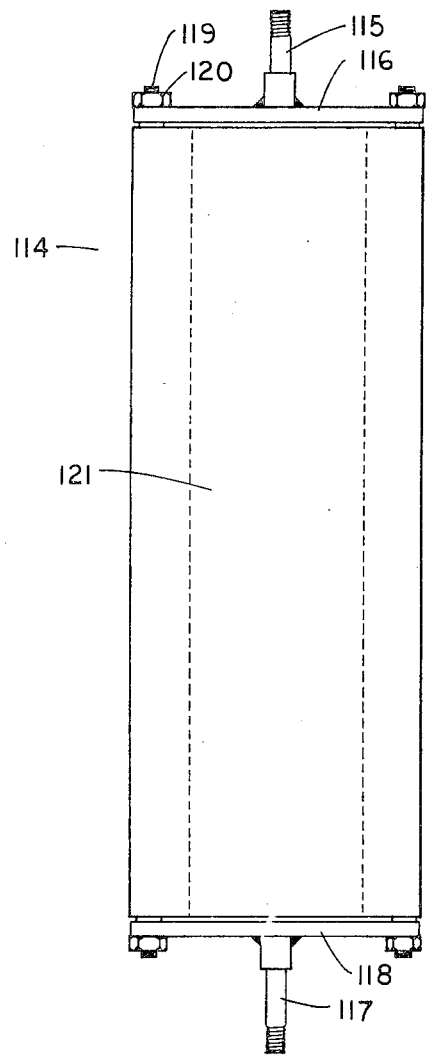
FIG. 11 is a side view of a flexible sail cloth type vane.
Figure 12:
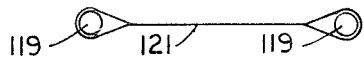
FIG. 12 is a cross-section through the center of FIG. 11.
Figure 13:
FIG. 13 is a cross-section through the center of FIG. 1, showing how the sail cloth is caused to curve by the wind.

FIG. 11 illustrates an alternative vane embodiment utilizing said cloth and intended for less expensive wind generators of this invention. This sail type vane 114 mounts within the rotor in the same manner as described previously for the solid type vanes shown in FIG. 5. This sail type vane has a top shaft 115 welded to a top cross-bar 116 and a bottom shaft 117 welded to a bottom cross-bar 118. Mounted between and through holes in the top cross-bar 116 and the bottom cross-bar 118 are two spacer rods 119 with shoulders abutting the cross-bars and with threaded ends for the installation of a nut 120 on each end of each spacer rod 119. The vane surface 121 is made of sail type cloth such as Dacron, sewn vertically so as to form loops, as shown in FIG. 12 to fit around the spacer rods 119. Any suitable method may be used to prevent the vane surfaces from sliding downward on the spacer rods, such as by means of screws passing through eyelets in the cloth and into the spacer rods. FIG. 13 illustrates how the force of the wind 122 will cause the cloth vane surface to form into a curve which is an effective shape for the development of aerodynamic lift and drag type forces.

FIGS. 15, 16 and 17 are vane orientation diagrams for use in describing the operation and control of this invention. In all three figures, the circles 123 represent the outer edge of a rotor, the arrows 124 indicate the wind direction, and the pointers 125 indicate a relative position of the normally stationary but incrementally adjustable orientation gear.

FIG. 15 shows the orientation gear pointer 125 pointed perpendicular to the wind with the eight vanes located in positions A through H and oriented by the orientation gear such that they will not cause rotor rotation, as they are oriented symmetrically with respect to a center-line A-E through the rotor. Since the vane at position E is perpendicular to the wind, it will produce the largest amount of aerodynamic drag, therefore the rotor will stand still so long as the wind direction remains as indicated.

FIG. 16 shows the orientation gear pointer 125 incrementally adjusted through clockwise angle 126 which in this case is 45 degrees, thus causing all eight vanes to rotate clockwise by an angle of 22½ degrees, due to the 2:1 gear ration between the orientation gear and the vane gears. With the vanes oriented as shown an imbalance is created, as the vanes on the left side of center-line A-E present a greater area to the wind than the area presented to the wind by the vanes on the right side of center-line A-E, and the rotor will commence to rotate clockwise as indicated by rotation arrow 128. At the instant of starting, and before the rotor has attained much speed the vanes are developing only drag type forces as their angles of attack with respect to the wind approaching their tips is too great for them to develop any significant amount of aerodynamic lift type forces. However as the rotor attains greater speed, the vanes will commence to develop lift type forces replacing the drag type forces and the net rotary forces or torque will remain relatively constant with increasing rotor speed, until a speed is reached which, if exceeded will cause the vanes to commence developing negative rotary forces and the rotor speed will remain constant so long as the orientation gear is held at its indicated position and the wind speed and direction does not change. This indicated position of the orientation gear is an intermediate position for rotor start-up and speed control purposes.

With the rotor now rotating the vane positions A THROUGH H now become instantaneous positions as the vanes are traveling with the rotor. The vane located instantaneously at positions A will sequentially pass through positions A, B, C, D, E, F, G, H, and again through position A. In sequentially passing through the positions the vane will also become oriented as indicated for the sequential positions and this will occur in a uniform and continuous manner. This vane orientation embodiment may be defined as a synchronous means of vane orientation, as the vane orientation is synchronized with the rotation of the rotor. Another important characteristic of this embodiment is that the vanes also reverse in direction with respect to the wind during each complete revolution of the rotor. Referring again to the vane located instantaneously at position A pleaase note particularly to tip of the vane which is pointing at about seven o'clock on the face of a clock. As this vane travels sequentially through positions A through H and again back to position A, during a complete revolution of the rotor the tip of the vane which was previously pointing at about seven o'clock, now points at about one o'clock. Also, as the rotor completes a second revolution, the vane tip pointing at one o'clock at the end of the first revolution will again be pointing at about seven o'clock at the end of the second revolution. Because of this characteristic of this embodiment it is necessary that the vanes have completely symmetrical airfoil shapes, which are symmetrical about their longitudinal axis as generally understood in aerodynamics and with their two vane ends shaped identically.

FIG. 17 shows the orientation gear pointer 125 incrementally adjusted through a larger clockwise angle 127 from its stand-still position in FIG. 15 which in this case is 90 degrees from its stand-still position, thus causing all eight vanes to rotate clockwise 45 degrees from the stand-still orientations shown in FIG. 15. With the orientation gear in this position and the vanes oriented as shown the rotor will rotate clockwise as indicated by arrow 128 and the rotor's rotational speed will increase still further, from the intermediate speed described for FIG. 16. If no external load is applied to the rotor, by the wind generator's driven machine, the rotor will continue to increase in speed until the vanes reach a peripheral speed in which they are traveling at 85 to 100 percent of the speed of the wind. At this speed the rotor will have passed through its maximum horsepower speed range and, with no external load applied to the rotor, it will stabilize at a speed in which the vanes are traveling slightly below the speed of the wind, which is a speed in which the vanes are developing only enough rotary forces to overcome all of the friction and aerodynamic drag type forces inherent in this invention's design. It should be explained at this point that if the rotor should reach a rotational speed in which the vanes are traveling at 100 percent of the speed of the wind, all of the vanes would have reached a null condition in which they would be effectively feathered into the wind, and thus would not be developing rotary forces. This is an impossible condition as there will always be rotary friction and aerodynamic drag type forces to be overcome, however it explains the self-governing characteristics of this invention in that the rotor cannot normally rotate at a speed in which the vanes are traveling faster than the speed of the wind, and therefore this invention's rotor cannot "run-away" when it is operating under no-load conditions. Referring again to FIG. 17 the vane which is instantaneously passing through position C is flat to the wind and therefore is instantaneously developing only aerodynamic drag type forces. Thus, if it is traveling slower than the wind the wind is pushing it along and if it is traveling faster than the wind the wind is opposing it. Also if it is traveling at the speed of the wind, it is neither aiding nor opposing rotor rotation. Thus, the instant this vane passes through position C it contributes only a small amount of the rotary force when the rotor is operating at normal speed however it has an advantage in that it contributes increasing rotary force as the rotor slows down, thus it provides higher torque at lower rotor speeds. However this condition exists only at the instant a vane passes exactly through position C, and only a few degrees before and after a vane passes this position, when the rotor is operating at normal speeds, the vane is developing very effective lift type forces since it has a favorable angle of attack with respect to the approaching wind.

The vane which is instantaneously passing through position G is instantaneously oriented into the wind, thus, at that instant, is not operating effectively in developing rotary forces but it is also oriented, at that instant, so as to minimize aerodynamic drag which reduces the rotary forces. However this condition exists only at the instant in which a vane passes exactly through position G, and only a few degrees before and after a vane passes this position the vane is developing very effective aerodynamic lift type forces since it has an effective angle of attack with respect to the wind approaching its tip. This angle of attack reaches zero degrees only exactly at position G. With the vanes oriented as shown in FIG. 17, and as the rotor speeds up and reaches a speed in which the vanes are traveling at approximately 75 percent of the wind speed, all of the vanes have gradually become oriented, with respect to the wind approaching their vane tips, such that they are effectively developing aerodynamic lift type forces throughout their circle of rotation, except during the brief instants in which the vanes are passing positions C and G. These brief instants are insignificant to the operation of this wind generator as all of the other vanes continue to generate rotary forces through these instants, thus making these instants a very minor percentage of the total torque and horsepower being developed by this wind powered generator. This invention has very desireable torque and horsepower generating characteristics. Its developed torque is quite high and almost constant from stand-still until the vanes reach approximately 70 percent of the wind speed. As the vane speed increases from 70 percent to 100 percent of the wind speed, its developed torque reduces graudally to zero. Its developed horsepower is zero at stand-still and its developed horsepower increases almost linearly with vane speed until its vanes are traveling at approximately 70 percent of the wind speed, and its developed horsepower reaches a maximum when its vanes are traveling at 75 to 80 percent of the wind speed. As its vane speed increases from 80 percent to 100 percent of the wind speed, its developed horsepower reduces gradually to zero.

The most useable operating speed of this invention is when its vanes are traveling at 85 to 95 percent of the wind speed, as within this speed range its torque and power output characteristics agree with the power demand characteristics of a typical electrical generator. When operating within this speed range, this wind generator develops both increased torque and increased horsepower as its rotor slows down, thus it automatically develops more torque and more horsepower to meet an increased torque or increased power demand, so long as the torque demanded and the power demanded remain below the maximum torque and power generating capacities of this wind generator for the wind speed conditions in which it is then operating. All of the above information is based upon calculations of the aerodynamic characteristics of this invention, and the actual characteristics of a wind generator built in accordance with this invention may vary from this information by an amount which is dependent upon the actual design and structural details of a full scale wind generator.

In describing the operation of this invention using FIG. 17, it should also be explained that this invention will operate equally well and be equally controllable, by means of the orientation gear, and orientation spindle attached thereto, in either direction of rotation of the rotor. Also, incremental adjustment of the orientation spindle by means of the orientation servo-mechanism, will provide yaw control to keep the rotor facing into the wind, speed control, power output control and aerodynamic braking to stop the rotor rapidly if this should become necessary. Also, by releasing the combination solonoid or manually operated clutch in the orientation servo-mechanism and allowing the orientation gear to rotate freely, this wind generator's rotor vanes will become disoriented with respect to the wind and will come to a stop. This means of stopping the rotor would normally be used only in emergencies, such as when excessively high speed winds should occur, or to put the wind generator into an inoperable condition.

Figure 18:
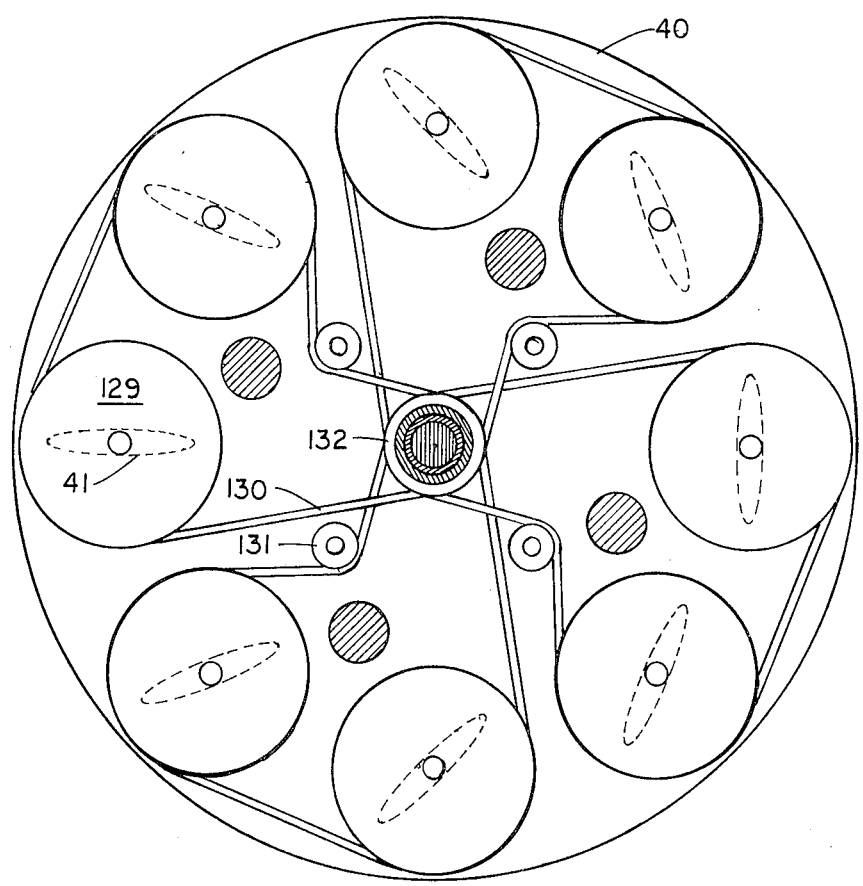
FIG. 18 is a view similar to FIG. 2, however showing an alternative vane orientation arrangement using timing belts and timing pulleys.

FIG. 18 is a bottom view, similar to FIG. 2, showing an alternative vane orientation arrangement using timing pulleys and timing belts (sometimes called "sprockets" in connection with "cog" belts) instead of gearing, as these components will also provide a positive, or non-slipping, vane orientation embodiment since timing pulleys have teeth which mesh with teeth on the timing belts. This view shows vane pulleys 129, timing belts 130, take-up pulleys 131 and an orientation pulley 132. Again in this view the vanes 41 are hidden behind the rotor's bottom support plate 40 and are shown with dashed lines so as to indicate how the vanes are oriented when the wind generator is assembled. In this embodiment the orientation pulley 132 has four belt grooves, and four timing belts 130 are used such that each timing belt is meshed with two vane pulleys and the orientation pulley. The four take-up pulleys 131 are for the purpose of maintaining proper tension in the timing belts. Since the orientation pulley has four grooves, and the timing belts must operate without rubbing against each other, each timing belt is spaced a different distance from the rotor's bottom support plate, and the two vane pulleys and take-up pulley associated with each timing belt are spaced accordingly from the rotor's bottom support plate, so that these components are properly aligned. Each of the orientation pulley grooves has exactly one half the pitch diameter of each identical vane pulley in order that one revolution of the orientation pulley will cause all of the vanes to rotate one half a revolution. For this embodiment the orientation pulley is mounted concentrically and firmly attached to an orientation spindle, similarly to that described for embodiments utilizing vane orientation gearing. In FIG. 18 please note that clockwise rotation of the orientation pulley, by one revolution, will cause all of the vanes to rotate clockwise by one half a revolution due to the 2:1 pitch diameter ratio between the orientation pulley and each identical vane pulley. The take-up pulleys are of any suitable diameter, have smooth surfaces as they do not mesh with the timing belts, and are rotatably mounted on adjustable shafts which are bolted to the rotor's bottom support plate. Thus, this embodiment provides a synchronous vane orientation means very similar to that described utilizing gearing. While the use of timing belts and pulleys will provide this means, it will incurr greater friction losses than gearing.

While eight vanes are shown in this embodiment, a greater or lesser number of vanes, pulleys and belts may be utilized, depending upon the requirements for a particular wind generator design employing this embodiment of this invention.

FIGS. 7, 8, 9 and 10 show several cross-sections of solid type airfoil shaped vanes, either tapered or non-tapered. These are elliptically and completely symmetrically shaped airfoil cross-sections in which the outer peripheries of the shapes are important embodiments of solid type airfoil shaped vanes of this invention so as to provide vanes which will efficiently develop aerodynamic lift and drag type forces so as to improve the power generating capability of this invention.

The airfoil cross-sections shown in FIGS. 7, 8, 9 and 10 are elleptically and symmetrically shaped such that: the sides of each shape are symmetrical about a longitudinal axis, or chord, and thus the two sides of each shape are mirror images of each other except for minor imperfections which may occur during manufacture and use of the vanes; the two ends of each shape are symmetrical about a lateral axis of the shape and thus the two ends of each shape are mirror images of each other except for minor imperfections which may occur during manufacture and use of the vanes; the maximum thickness of each shape is 10 to 16 percent of its length from tip to tip, or chord length, such that the shape has a 0.10 to 0.16 thickness to chord ratio; both tips of each shape are rounded at a radius which is less than 15 percent of the maximum thickness of the shape; both sides of each shape are rounded at one or more radii of curvature, each radius of which is larger than the shape's chord length, along both sides of each shape for at least 20 percent of the shape's chord length so that the thickness of each shape gradually increases from either tip until the thickness reaches the maximum thickness of the shape.

All of the elliptically and completely symmetrically shaped cross-sections of FIGS. 7, 8, 9 and 10 are in accordance with the above defined shapes and are applicable to the solid type airfoil shaped vanes of this invention.

For this invention, it is preferred that the solid type airfoil shaped vanes have an airfoil cross-section with a 0.12 to 0.14 thickness to chord ratio. It is also preferred that the trailing tip be quite sharp so as to minimize aerodynamic losses and mazimize the vane's lift coefficient. However, for this invention, the vane tips, or ends, must be identical as the vanes reverse with respect to the wind with each complete revolution of the rotor. Thus it is also preferred that the vane tips, or ends, be rounded such that tip stall will not occur when the wind is approaching either tip of the vane. Since the vanes of this invention operate at relatively low tip speeds with respect to the wind speed, tip stall is unlikely to occur if both tips of each vane are rounded to a small radius of curvature and their surfaces immediately following the vanes tips on both sides of the vane have uniform curvature.

Figure 7:
FIGS. 7, 8, 9, and 10 show airfoil shapes which are applicable to this invention.

FIG. 7 is a 10 degree ellipse and is the shape used in all of the illustrations. A lesser degree ellipse with a 0.12 to 0.14 thickness to chord ratio is in accordance with these preferences.

Figure 8:
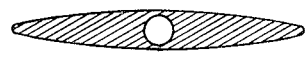

FIG. 8 shows a modified ellipse which is in accordance with these preferences and is an improved shape as it has tips with smaller radii of curvature.

Figure 9:
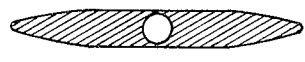

FIG. 9 shows a further modified elliptical shape which is in accordance with these preferences and which may be easier to manufacture since it has sides which are parallel for about half the chord length of the shape.

Figure 10:
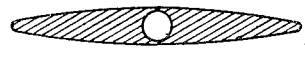

FIG. 10 shows another completely symmetrical shape which is in accordance with these preferences and which may also be easier to manufacture since it has sides which are curved uniformly as arcs of a circle. This shape may also be defined as elliptical even though an ellipse consists of varying arcs of a circle.

The preferred embodiment of a solid type airfoil shaped vane of this invention is that it have formers made of thin material, such as aluminum, evenly spaced along and attached to its vane shaft and with an outside profile agreeing with an airfoil shape as described, and illustrated in FIGS. 7,8,9 and 10, and with a thin surface material, such as aluminum sheet, fastened to the former's outside profiles by flush rivets.

An alternative embodiment of a solid type airfoil shaped vane is such that a thin surface material, such as aluminum sheet, is pre-formed into an airfoil shape as described, and illustrated in FIGS. 7,8,9 and 10, and fastened to its vane shaft on both contacting sides of its vane shaft by welding or by flush rivets, and such that the void spaces between the vane shaft and thin surface material are then filled with structural foam, such as Styro-foam.

It is also preferred that the vane surfaces be smooth so as to offer the least resistance to air flow over their surfaces.

While the above descriptions explain many of the embodiments of this invention, these should not be construed as limitations on the scope of this invention. Many other embodiments are possible, for example: This invention can be equipped with any suitable number of vanes with the synchronous vane orientation means arranged accordingly; The outer edges of the support plates are shown as circular whereas they may be of other shapes such as octagonal; the vanes may be twisted to attain desired aerodynamic characteristics in some embodiments of this invention; additional rotor sections may be mounted on top of the rotors shown in FIGS. 1,3,4 and 14, with the rotor sections locked together and the vane shafts coupled together so the lower rotor section would provide vane orientation, power output gearing and operational control for all rotor sections thus, in effect, providing intermediate support for the vane shafts of extremely tall wind generators of this invention.

Also the scope of this invention should not exclude external means for control of the operation of this invention, such as by commonly employed instrumentation, sensors, metering devices, switches, transformers, rectifiers, batteries, synchronous inverters, relays, wind direction detectors, anemometers and computers.

Considering this description it is likely that modifications and improvements will occur to those persons skilled in the arts which are within the scope of this invention.

Since the synchronous vane orientation means of this invention may utilize either gearing or timing belts and pulleys to provide positive, or non-slipping, vane orientation means, some claims which follow will use the term "toothed-wheel" to describe either a gear or a timing pulley, and will use the term "positive rotation coupling device" to describe either an idler gear rotatable mounted on its associated shaft or a timing belt with its associated take-up pulley and mounting. This terminology is used to reduce the number of claims yet adequately claim each embodiment of this invention.

I claim:

1. A vertical axis wind powered generator comprising:
   a stationary mainshaft support means;
   a rotor rotatably mounted on and supported by a said stationary mainshaft;
   a wind energy conversion means;
       said rotor equipped with a multitude of airfoil shaped vanes, each said vane attached to its vane shaft and each said vane shaft rotatably mounted on a top circle of rotation at the top of said rotor and each said vane shaft rotatably mounted on a bottom circle of rotation at the bottom of said rotor, such that said circles of rotation have equal diameters and such that said circles of rotation are concentric with each other and with said vertical axis, and such that the top ends of said vane shafts are rotatably supported and equally spaced from each other by a pervious top support plate, and such that the bottom said ends of said vane shafts are rotatably supported and equally spaced from each other by a pervious bottom support plate, and such that aerodynamic forces developed by said airfoil shaped vanes are transferred to said support plates as rotary forces, and thus to said rotor as rotary forces;
   a synchronous vane orientation means;
       a normally stationary but incrementally adjustable orientation toothed-wheel mounted concentrically with and attached to a normally stationary but incrementally adjustable orientation spindle, and having exactly one half the pitch diameter of each vane toothed-wheel; a multitude of identical said vane toothed-wheels equal to the quantity of said multitude of airfoil shaped vanes such that one said vane toothed-wheel is mounted on and attached to one said vane shaft such that rotation of said vane toothed-wheel will cause rotation of said vane shaft which in turn will cause rotation of said airfoil shaped vane and such that each said vane toothed-wheel will mesh with a positive rotation coupling device which has any suitable pitch diameter, or pitch length, which will mesh with said multitude of identical said vane toothed-wheels and simultaneously mesh with said orientation toothed-wheel; a said rotor constructed such that said bottom support plate also provides support and alignment means for said quantity of said positive rotation coupling devices in such a manner that said quantity of said positive rotation coupling devices will cause all said multitude of said vane toothed-wheels to rotate simultaneously when said quantity of said positive rotation coupling devices is caused to rotate simultaneously by said orientation toothed-wheel; a said orientation spindle mounted concentrically with said mainshaft in a manner in which the angular position of said orientation spindle may be held stationary, or may be incrementally adjusted, by means located externally to said wind generator's said rotor, regardless of whether said rotor is stationary or rotating; and whereby holding said orientation spindle stationary while said rotor is rotating provides a said synchronous vane orientation means whereby the orientations of all said multitude of airfoil shaped vanes with respect to the wind is synchronized with the rotation of said rotor, and whereby angular incremental adjustment of the position of said orientation spindle provides a means for incremental and simultaneous adjustment of the orientations of all said vanes with respect to the wind so as to control the aerodynamic forces developed by said airfoil shaped vanes and thus control the rotary forces, rotary speed and power output of said rotor, or so as to cause said rotor to rotate in either direction of rotation;

an orientation spindle adjustment means;
an orientation servo-mechanism, located externally to said wind powered generator's said rotor, and said servo-mechanism equipped with an output shaft which is rotationally coupled to said orientation spindle such that adjusting, either manually or electrically, said orientation servo-mechanism's said output shaft in angular increments provides a means for adjusting said orientation spindle in angular increments with respect to the said wind so as to externally control the said synchronized orientations of the said airfoil shaped vanes with respect to the wind and thus externally control the said aerodynamic forces developed by said airfoil shaped vanes;

a power output means;
means for transferring the said rotary forces and said power output of said rotor from said rotor to the shaft of a driven machine, such as an electrical A.C. or D.C. generator.

2. A vertical axis wind powered generator comprising:
a rotatable mainshaft support means;
a rotor attached to, and supported by, a rotatably supported said mainshaft whereby said mainshaft comprises a part of said rotor;
a wind energy conversion means;
said rotor equipped with a multitude of airfoil shaped vanes, each said vane attached to its vane shaft and each said vane shaft rotatably mounted on a top circle of rotation at the top of said rotor, and each said vane shaft rotatably mounted on a bottom circle of rotation at the bottom of said rotor, such that said circles of rotation have equal diameters and such that said circles of rotation are concentric with each other and with said vertical axis, and such that the top ends of said vane shafts are rotatably supported and equally spaced from each other by a pervious top support plate, and such that the bottom said ends of said vane shafts are rotatably supported and equally spaced from each other by a pervious bottom support plate, and such that aerodynamic forces developed by said airfoil shaped vanes are transferred to said support plates as rotary forces, and thus to said rotor as rotary forces;

a synchronous vane orientation means;
a normally stationary but incrementally adjustable orientation toothed-wheel mounted concentrically with and attached to a normally stationary but incrementally adjustable orientation spindle and having exactly one half the pitch diameter of each vane toothed-wheel; a multitude of identical said vane toothed-wheels equal to the quantity of said multitude of airfoil shaped vanes such that one said vand toothed-wheel is mounted on and attached to one said vane shaft such that rotation of said vane toothed-wheel will cause rotation of said vane shaft which in turn will cause rotation of said airfoil shaped vane and such that each said vane toothed-wheel will mesh with a positive rotation coupling device which has any suitable pitch diameter, or pitch length, which will mesh with said multitude of identical said vane toothed-wheels and simultaneously mesh with said orientation toothed-wheel; a said rotor constructed such that said bottom support plate also provides support and alignment means for said quantity of said positive rotation coupling devices in such a manner that said quantity of said positive rotation coupling devices will cause all said multitude of said vane toothed-wheels to rotate simultaneously when said quantity of said positive rotation coupling devices is caused to rotate simultaneously by said orientation toothed-wheel; a said orientation spindle mounted concentrically with said mainshaft in a manner in which the angular position of said orientation spindle may be held stationary, or may be incrementally adjusted, by means located externally to said wind generator's said rotor, regardless of whether said rotor is stationary or rotating; and whereby holding said orientation spindle stationary while said rotor is rotating provides a said synchronous vane orientation means whereby the orientations of all said multitude of airfoil shaped vanes with respect to the wind is synchronized with the rotation of said rotor, and whereby angular incremental adjustment of the position of said orientation spindle provides a means for incremental and simultaneous adjustment of the orientations of all said vanes with respect to the wind so as to control the aerodynamic forces developed by said airfoil shaped vanes and thus control the rotary forces, speed and power output of said rotor, or so as to cause said rotor to rotate in either direction of rotation;

an orientation spindle adjustment means;
an orientation servo-mechanism, located externally to said wind powered generator's said rotor, and said servo-mechanism equipped with an output shaft which is rotationally coupled to said orientation spindle such that adjusting, either manually of electrically, said orientation servo-mechanism's said output sahft in angular increments provides a means of adjusting said orientation spindle in angular increments with respect to the said wind so as to externally control the said synchronized orientations of the said airfoil shaped vanes with respect to the wind and thus externally control the said aerodynamic forces developed by said airfoil shaped vanes;

a power output means;

means for transferring the said rotary forces and said power output of said rotor from said rotor to the shaft of a driven machine, such as an electrical A.C. or D.C. generator.

3. A vertical axis wind powered generator comprising:

a stationary mainshaft support means;
a rotor rotatably mounted on and supported by a said stationary mainshaft;
a wind energy conversion means;
said rotor equipped with a multitude of airfoil shaped vanes, each said vane attached to its vane shaft and each said vane shaft rotatably mounted on a top circle of rotation at the top of said rotor and each said vane shaft rotatably mounted on a bottom circle of rotation at the bottom of said rotor, such that said top circle of rotation has a larger diameter than a smaller diameter of said bottom circle of rotation such that said vane shafts are thereby tilted with respect to said vertical axis to a said larger diameter at the said top of said rotor than a said smaller diameter at the said bottom of said rotor, and such that said top and said bottom circles of rotation are concentric with each other and with said vertical axis, and such that the top ends of said vane shafts are rotatably supported and equally spaced from each other by a pervious top support plate, and such that the bottom said ends of said vane shafts are rotatably supported and equally spaced from each other by a pervious bottom support plate, and such that aerodynamic forces developed by said airfoil shaped vanes are transferred to said support plates and thus to said rotor as rotary forces in which said aerodynamic forces and thus said rotary forces are in proportion to the higher wind energies which naturally occur at the said top of a tall said rotor as compared to the lower said wind energies which naturally occur at the said bottom of a said tall said rotor;

a synchronous vane orientation means;
a normally stationary but incrementally adjustable orientation toothed-wheel mounted concentrically with and attached to a normally stationary but incrementally adjustable orientation spindle, and having exactly one half the pitch diameter of each vane toothed-wheel; a multitude of identical said vane toothed-wheels equal to the quantity of said multitude of airfoil shaped vanes such that one said vane toothed-wheel is mounted on and attached to one said vane shaft such that rotation of said vane toothed-wheel will cause rotation of said vane shaft which in turn will cause rotation of said airfoil shaped vane and such that each said vane toothed-wheel will mesh with a positive rotation coupling device which has any suitable pitch diameter, or pitch length, which will mesh with said multitude of identical said vane toothed-wheels and simultaneously mesh with said orientation toothed-wheel; a said rotor constructed such that said bottom support plate also provides support and alignment means for said quantity of said positive rotation coupling devices in such a manner that said quantity of said positive rotation coupling devices will cause all said multitude of said vane toothed-wheels to rotate simultaneously when said quantity of said positive rotation coupling devices is caused to rotate simultaneously by said orientation toothed-wheel; a said orientation spindle mounted concentrically with said mainshaft in a manner in which the angular position of said orientation spindle may be held stationary, or may be incrementally adjusted, by means located externally to said wind generator's said rotor, regardless of whether said rotor is stationary or rotating; and wherby holding said orientation spindle stationary while said rotor is rotating provides a said synchronous vane orientation means whereby the orientations of all said multitude of airfoil shaped vanes with respect to the wind is synchronized with the rotation of said rotor, and whereby angular incremental adjustment of the position of said orientation spindle provides a means for incremental and simultaneous adjustment of the orientations of all said vanes with respect to the wind so as to control the aerodynamic forces developed by said airfoil shaped vanes and thus control the rotary forces, rotary speed and power output of said rotor, or so as to cause said rotor to rotate in either direction or rotation;

an orientation spindle adjustment means;
an orientation servo-mechanism, located externally to said wind powered generator's said rotor, and said servo-mechanism equipped with an output shaft which is rotationally coupled to said orientation spindle such that adjusting, either manually or electrically, said orientation servo-mechanism's said output shaft in angular increments provides a means for adjusting said orientation spindle in angular increments with respect to the said wind so as to externally control the said synchronized orientations of the said airfoil shaped vanes with respect to the wind and thus externall control the said aerodynamic forces developed by said airfoil shaped vanes;

a power output means;

means for transferring the said rotary forces and said power output of said rotor from said rotor to the shaft of a driven machine, such as an electrical A.C. or D.C. generator.

4. A vertical axis wind powered generator comprising:

a rotatable mainshaft support means;
a rotor attached to, and supported by, a rotatably supported said mainshaft whereby said mainshaft comprises a part of said rotor;
a wind energy conversion means;
said rotor equipped with a multitude of airfoil shaped vanes, each said vane attached to its vane shaft and each said vane shaft rotatably mounted on a top circle of rotation at the top of said rotor and each said vane shaft rotatably mounted on a bottom circle of rotation at the bottom of said rotor, such that said top circle of rotation has a larger diameter than a smaller diameter of said bottom circle of rotation such that said vane shafts are thereby tilted with respect to said vertical axis to a said larger diameter at the said top of said rotor than a said smaller diameter at the said bottom of said rotor, and such that said top and said bottom circles of rotation are concentric with each other and with said vertical axis, and such that the top ends of said vane shafts are rotatably supported and equally spaced from each other by a pervious top support plate, and such that the bottom said ends of said vane shafts are rotatably supported and equally spaced from each other by a pervious bottom support plate, and such that aerodynamic forces developed by said airfoil shaped vanes are transferred to said support plates and thus to said rotor as rotary forces in which said aerodynamic forces and thus said rotary forces are in proportion to the higher wind energies which naturally occur at the said top of a tall said rotor as compared to the lower said wind energies which naturally occur at the said bottom of a said tall said rotor;

a synchronous vane orientation means;

a normally stationary but incrementally adjustable orientation toothed-wheel mounted concentrically with and attached to a normally stationary but incrementally adjustable orientation spindle, and having exactly one half the pitch diameter of each vane toothed-wheel; a multitude of identical said vane toothed-wheels equal to the quantity of said multitude of airfoil shaped vanes such that one said vane toothed-wheel is mounted on and attached to one said vane shaft such that rotation of said vane toothed-wheel will cause rotation of said vane shaft which in turn will cause rotation of said airfoil shaped vane and such that each said vane toothed-wheel will mesh with a positive rotation coupling device which has any suitable pitch diameter, or pitch length, which will mesh with said multitude of identical said vane toothed-wheels and simultaneously mesh with said orientation toothed-wheel; a said rotor constructed such that said bottom support plate also provides support and alignment means for said quantity of said positive rotation coupling devices in such a manner that said quantity of said positive rotation coupling devices will cause all said multitude of said vane toothed-wheels to rotate simultaneously when said quantity of said positive rotation coupling devices is caused to rotate simultaneously by said orientation toothed-wheel; a said orientation spindle mounted concentrically with said main-shaft in a manner in which the angular position of said orientation spindle may be held stationary, or may be incrementally adjusted, by means located externally to said wind generator's said rotor, regardless of whether said rotor is stationary or rotating; and whereby holding said orientation spindle stationary while said rotor is rotating provides a said synchronous vane orientation means whereby the orientations of all said multitude of airfoil shaped vanes with respect to the wind is synchronized with the rotation of said rotor, and whereby angular incremental adjustment of the position of said orientation spindle provides a means for incremental and simultaneous adjustment of the orientations of all said vanes with respect to the wind so as to control the aerodynamic forces developed by said airfoil shaped vanes and thus control the rotary forces, rotary speed and power output of said rotor, or so as to cause said rotor to rotate in either direction of rotation;

an orientation spindle adjustment means;

an orientation servo-mechanism, located externally to said wind powered generator's said rotor, and said servo-mechanism equipped with an output shaft which is rotationally coupled to said orientation spindle such that adjusting, either manually or electrically, said orientation servo-mechanism's said output shaft in angular increments provides a means for adjusting said orientation spindle in angular increments with respect to the said wind so as to externally control the said synchronized orientations of the said airfoil shaped vanes with respect to the wind and thus externally control the said aerodynamic forces developed by said airfoil shaped vanes, a power output means;

means for transferring the said rotary forces and said power output of said rotor from said rotor to the shaft of a driven machine, such as an electrical A.C. or D.C. generator.

5. A vertical axis wind powered generator according to claim 1 further comprising:

a first means for improving the energy conversion efficiency of said wind powered generator;

said pervious top and bottom support plates of said rotor constructed such that said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator.

6. A vertical axis wind powered generator according to claim 1 further comprising:

a second means for improving the energy conversion efficiency of said wind powered generator;

said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said suport plate; said outer circumferences of said impervious surfaces located closely to the circumferences of the said circles of rotation of the said vane shafts on said top and said bottom plates; said impervious surface areas therby covering sufficient said inner areas of said support plates so as to prevent the wind from flowing either upward or downward out of the interior of the said rotor; said rotor thereby constructed such that said impervious surfaces will force the wind which has flowed past the windward said airfoil shaped vanes, and entered the said interior of said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator.

7. A vertical axis wind powered generator according to claim 1 further comprising:
   a first means for improving the energy conversion efficiency of said wind powered generator;
      said pervious top and bottom support plates of said rotor constructed such that the said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator, and;
   a second means for improving the energy conversion efficiency of said wind powered generator;
      said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said cirdles of rotation of the said vane shafts on said top and said bottom support plates; said impervious surface areas thereby covering sufficient said inner areas of said support plates so as to prevent the wind from flowing either upward or downward out of the interior of the said rotor; daid rotor thereby constructed such that said impervious surfaces will force the wind which has flowed past the windward said airfoil shaped vanes, and entered the said interior of the said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator
   both said first and said second means combined wherein said pervious support plates are constructed with impervious surfaces covering the entire inner areas of said support plates such that said support plates thereby are said impervious said top and said bottom support plates.

8. A vertical axis wind powered generator according to claim 2 further comprising:
   a first means for improving the energy conversion efficiency of said wind powered generator;
      said pervious top and bottom support plates of said rotor constructed such that said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator.

9. A vertical axis wind powered generator according to claim 2 further comprising:
   a second means for improving the energy conversion efficiency of said wind powered generator;
      said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said circles of rotation of the said vane shafts on said top and said bottom plates; said impervious surface areas therby covering sufficient said inner areas of said support plates so as to prevent the wind from flowing either upward or downward out of the interior of the said rotor; said rotor thereby constructed such that said impervious surfaces will force the wind which has flowed past the windward said airfoil shaped vanes, and entered the said interior of said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator.

10. A vertical axis wind powered generator according to claim 2 further comprising:
    a first means for improving the energy conversion efficiency of said wind powered generator;
       said pervious top and bottom support plates of said rotor constructed such that the said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator, and;
    a second means for improving the energy conversion efficiency of said wind powered generator;
       said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said cirdles of rotation of the said vane shafts on said top and said bottom support plates; said impervious surfaces areas thereby covering sufficient said inner areas of said support plates so as to prevent the wind from flowing either upward downward out of the interior of the said rotor; said rotor thereby constructed such that said impervious surfaces will force the wind which has flowed past the windward said airfoil shaped vanes, and entered the said interior of the said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator both said first and said second means combined wherein said pervious support plates are constructed with impervious surfaces covering the entire inner areas of said support plates such that said support plates thereby are said impervious said top and said bottom support plates.

11. A vertical axis wind powered generator according to claim 3 further comprising:

a first means for improving the energy conversion efficiency of said wind powered generator;

said pervious top and bottom support plates of said rotor constructed such that said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator.

12. A vertical axis wind powered generator according to claim 3 further comprising:

a second means for improving the energy conversion efficiency of said wind powered generator;

said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said circles of rotation of the said vane shafts on said top and said bottom plates; said impervious surface areas thereby covering sufficient said inner areas of said support plates so as to prevent the wind from flowing either upward or downward out of the interior of the said rotor; said rotor thereby constructed such that said impervious surfaces will force the wind which has flowed past the windward said airfoil shaped vanes, and entered the said interior of said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator.

13. A vertical axis wind powered generator according to claim 3 further comprising:

a first means for improving the energy conversion efficiency of said wind powered generator;

said pervious top and bottom support plates of said rotor constructed such that the said support plates have impervious surfaces located close to the said top end and the said bottom end of each said airfoil shaped vanes so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator, and;

a second means for improving the energy conversion efficiency of said wind powered generator;

said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said cirdles of rotation of the said vane shafts on said top and said bottom support plates; said impervious surface areas thereby covering sufficient said inner areas of said support plates so as to prevent the wind from flowing either upward or downward out of the interior of the said rotor; said rotor thereby constructed such that said impervious surfaces will force the wind which has flowed past the windward said airfoil shaped vanes, and entered the said interior of the said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator both said first and said second means combined wherein said pervious support plates are constructed with impervious surfaces covering the entire inner areas of said support plates such that said support plates thereby are said impervious said top and said bottom support plates.

14. A vertical axis wind powered generator according to claim 4 further comprising:

a first means for improving the energy conversion efficiency of said wind powered generator;

said pervious top and bottom support plates of said rotor constructed such that said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator.

15. A vertical axis wind powered generator according to claim 4 further comprising:

a second means for improving the energy conversion efficiency of said wind powered generator;

said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said circles of rotation of the said vane shafts on said top and said bottom plates; said impervious surface areas thereby covering sufficient said inner areas of said support plates so as to prevent the wind from flowing either upward or downward out of the interior of the said rotor; said rotor thereby constructed such that said impervious surfaces will force the wind which has flowed part the windward said airfoil shaped vanes, and entered the said interior of said rotor, to also flow past the leeward said airfoil shaped vanes as so to increase the said aerodynamic forces developed by the said leeward said airfoil shaped vanes and thus provide a said second means for improving the energy conversion efficiency of the said wind powered generator.

16. A vertical axis wind powered generator according to claim 4 further comprising:

a first means for improving the energy conversion efficiency of said wind powered generator;

said pervious top and bottom support plates of said rotor constructed such that the said support plates have impervious surfaces located close to the said top end and the said bottom end of each said airfoil shaped vane so as to limit the flow of the wind between the said impervious surfaces and the said ends of the said airfoil shaped vanes and thereby force the wind to flow past the sides of the said airfoil shaped vanes so as to increase the said aerodynamic forces developed by the said airfoil shaped vanes and thus provide a said first means for improving the energy conversion efficiency of the said wind powered generator, and;

a second means for improving the energy conversion efficiency of said wind powered generaotor;

said pervious top and bottom support plates of said rotor constructed such that said support plates have impervious surfaces located close to the said top end and the said bottom end of each said airfoil shaped vane and such that said impervious surfaces cover the inner areas of said pervious said top and said bottom support plates; said inner areas extending from the inner circumference of each said support plate to an outer circumference of each said support plate; said outer circumferences of said impervious surfaces located closely to the circumferences of the said cirdles of rotation of the said vane shafts on said top and said bottom support plates; said impervious surface areas thereby covering sufficient said inner areas of said support plates so as to prevent the wind from flowing either upward or downward out of the interior of the said rotor; said rotor thereby constructed such that said impervious surfaces will force the wind which has flowed past the windward said airfoil shaped vanes, and entered the said interior of the said rotor, to also flow past the leeward said airfoil shaped vanes so as to increase the said aerodynamic forces developed by the said leeward said airfoil shaped vanes and thus provide a said second means for improving the energy conversion efficiency of the said wind powered generator both said first and said second means combined wherein said pervious support plates are constructed with impervious surfaces covering the entire inner areas of said support plates such that said support plates thereby are said impervious said top and said bottom support plates.

17. A vertical axis wind powered generator according to any one of claims 1, 2, 3, 4, 5, 6, 7, 8, 9,10, 11, 12, 13, 14, 15 or 16 and further comprising:

an aerodynamic means;

said airfoil shaped vanes constructed as solid type and non-tapered vanes, each said airfoil shaped vane having a completely symmetrical and reversible airfoil shape, a cross-section of which is described as generally elliptical with rounded ends, or tips, and rounded sides such that the said airfoil shape's tips are quite thin, and the thickness of said airfoil shape gradually and smoothly increases from each said tip toward the center until said thickness reaches a maximum thickness which is 10 to 16 percent of the chord length of said airfoil shape, thus said airfoil shape has a 0.10 to 0.16 thickness to chord ratio, and is thereby shaped so as to effectively develop aerodynamic lift type forces when the wind is approaching either said tip of said airfoil shape at an effective angle of attack.

18. A vertical axis wind powered generator according to any one of claims 3, 4, 11, 12, 13, 14, 15, or 16 and further comprising:

an aerodynamic means;

said airfoil shaped vanes constructed as solid type and tapered vanes; each said airfoil shaped vane having a completely symmetrical and reversible airfoil shape, a cross-section of which is described as generally elliptical with rounded ends, or tips, and rounded sides such that the said airfoil shape's tips are quite thin, and the thickness of said airfoil shap gradually and smoothly increases from each said tip toward the center until said thickness reaches a maximum thickness which is 10 to 16 percent of the chord length of said airfoil shape, thus said airfoil shape has a 0.10 to 0.16 thickness to chord ratio, and is thereby shaped so as to effectively develop aerodynamic lift type forces when the wind is approaching either said tip of said airfoil shape at an effective angle of attack; and a vane area increasing means;

said airfoil shaped vanes constructed such that the said chord length at the top of each said vane is longer than the said chord length at the bottom of each said vane, and such that each said vane is uniformly tapered from said top to said bottom so as to provide each vane with a greater side area, for each vertical foot of vane, at the top of said vane than the side area, for each vertical foot of vane, at the bottom of said vane, thus providing said wind powered generator with tapered vanes so as to increase the rotary force and power developed by said wind powered generator in proportion to the said increased said side area of each said vane, and increased side areas of said multitude of airfoil shaped vanes, without increasing the solidity ratio at the said top of said wind generator's rotor as compared to the solidity ratio at the bottom of said wind generator's said rotor, thus providing a separate and distinct means for increasing the rotary force and power developed by a said tall said wind powered generator of this invention.

19. A vertical axis wind powered generator according to any one of claims 1, 2, 3, or 4 and further comprising:

an aerodynamic means;

flexible sail cloth type non-tapered airfoil shaped vanes, each said vane constructed such that the force of the wind approaching its said sail cloth surface will cause the said sail cloth surface to form into the shape of a curve which is an effective said airfoil shape which is caused to be symmetrical and reversible by the force of the said wind upon its said cloth surface, and thus is effective in developing aerodynamic lift type forces when the wind is approaching either end of said airfoil shape at an effective angle of attack.

20. A vertical axis wind powered generator according to any one of claims 1, 2, 3, or 4 and further comprising:

an orientation spindle position indicating device rotationally coupled to said orientation spindle and thus rotationally coupled to said orientation toothed-wheel; said device having a sending unit, which is rotationally connected to said orientation spindle, and a remotely located receiving unit, said sending unit electrically connected to said receiving unit which thus will remotely indicate the angular position of the said orientation spindle.

* * * * *

UNITED STATES PATENT AND TRADEMARK OFFICE
CERTIFICATE OF CORRECTION

PATENT NO. : 4,609,827

DATED : September 2, 1986

INVENTOR(S) : Richard E. Nepple

It is certified that error appears in the above-identified patent and that said Letters Patent is hereby corrected as shown below:

Column 5, line 55, "square" should read -- cube --.
Column 6, line 67, "Fig. 1" should read -- Fig. 11 --.
Column 16, line 12, "ration" should read -- ratio --.

Signed and Sealed this

Eleventh Day of November, 1986

Attest:

DONALD J. QUIGG

Attesting Officer

Commissioner of Patents and Trademarks